US012441121B2

(12) United States Patent
Genda

(10) Patent No.: US 12,441,121 B2
(45) Date of Patent: Oct. 14, 2025

(54) SYSTEM, NETWORK DEVICE, SYSTEM CONTROL METHOD, AND RECORDING MEDIUM

(71) Applicant: CANON KABUSHIKI KAISHA, Tokyo (JP)

(72) Inventor: Yasuhisa Genda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 18/310,296

(22) Filed: May 1, 2023

(65) Prior Publication Data

US 2023/0356533 A1 Nov. 9, 2023

(30) Foreign Application Priority Data

May 6, 2022 (JP) ................................ 2022-076540

(51) Int. Cl.
*B41J 2/175* (2006.01)

(52) U.S. Cl.
CPC ................................ *B41J 2/17566* (2013.01)

(58) Field of Classification Search
CPC .................................................. B41J 2/17566
See application file for complete search history.

(56) References Cited

U.S. PATENT DOCUMENTS

| | | | | |
|---|---|---|---|---|
| 10,336,086 | B2 | 7/2019 | Matsuda | |
| 11,235,584 | B2 | 2/2022 | Hirai et al. | |
| 2002/0099630 | A1* | 7/2002 | Aruga | G06Q 10/06 705/28 |
| 2003/0227501 | A1* | 12/2003 | Hatasa | B41J 2/1752 347/50 |
| 2016/0279963 | A1* | 9/2016 | Koganehira | B41J 29/13 |
| 2016/0288515 | A1* | 10/2016 | Matsuda | B41J 2/17543 |
| 2021/0354488 | A1* | 11/2021 | Nakamura | B41J 29/393 |

FOREIGN PATENT DOCUMENTS

| | | | |
|---|---|---|---|
| JP | 2016194771 | A | 11/2016 |
| JP | 2021030459 | A | 3/2021 |

* cited by examiner

*Primary Examiner* — Jason S Uhlenhake
(74) *Attorney, Agent, or Firm* — Canon U.S.A., Inc. IP Division

(57) ABSTRACT

A system that manages at least one consumable material used by at least one device includes a memory storing instructions, and a processor executing the instructions causing the system to manage information regarding the consumable material for at least one container, acquire consumed amounts of the consumable material or remaining amounts of the consumable material from the at least one device using the consumable material in the respective container, and transmit information regarding a request to deliver a new container of the consumable material to a delivery service that delivers the new container of the consumable material used by the at least one device on the basis of a total amount of consumption obtained by summing the consumed amounts of the consumable material or the remaining amounts of the consumable material.

13 Claims, 18 Drawing Sheets

SYSTEM, NETWORK DEVICE, SYSTEM CONTROL METHOD, AND RECORDING MEDIUM

FIELD

The present disclosure relates to a system that manages a consumable material, a network device, a system control method, and a recording medium.

DESCRIPTION OF THE RELATED ART

In the related art, there is a system that transmits the amount of consumed ink, which is a consumable material, to a server, manages the remaining amount of ink, and automatically delivers a replacement ink cartridge if the remaining amount of ink reaches a predetermined level. Japanese Patent Laid-Open No. 2016-194771 discloses a server device that acquires the remaining amount of ink and a printer ID from a printer and provides an instruction to deliver a cartridge to a user of the printer corresponding to the printer ID to an external device in a case where the remaining amount of ink is equal to or less than a threshold value. On the other hand, a printer including a refillable liquid tank where ink of a liquid bottle can be refilled has appeared in recent years. In such a printer, there is a likelihood that the ink may remain in the ink bottle when the remaining amount of ink with which the printer is filled is low. Japanese Patent Laid-Open No. 2021-30459 discloses a print device that estimates a timing at which consumption of ink with which an ink bottle is filled will be completed on the basis of the amount of ink consumed per predetermined period of time and provides a request to deliver an ink bottle before consumption of the ink is completed.

Although the print device according to Japanese Patent Laid-Open No. 2021-30459 provides the request to deliver an ink bottle on the basis of the amount of consumed ink used by the device itself (one printer), the ink bottle can be used by a plurality of printers together, in general. The system according to Japanese Patent Laid-Open No. 2021-30459 cannot calculate a timing at which consumption of the ink in the ink bottle will be completed in the case where a plurality of printers calculate the amount of consumed ink, and the system cannot deliver the ink bottle before consumption of the ink bottle is completed.

SUMMARY

The present disclosure provides a system that places an order for a consumable material at an appropriate timing.

According to an aspect of the present disclosure, a system that manages at least one consumable material used by at least one device includes a memory storing instructions, and a processor executing the instructions causing the system to manage information regarding the consumable material for at least one container, acquire consumed amounts of the consumable material or remaining amounts of the consumable material from the at least one device using the consumable material in the respective container, and transmit information regarding a request to deliver a new container of the consumable material to a delivery service that delivers the new container of the consumable material used by the at least one device on the basis of a total amount of consumption obtained by summing the consumed amounts of the consumable material or the remaining amounts of the consumable material.

Further features of the present disclosure will become apparent from the following description of exemplary embodiments with reference to the attached drawings.

DESCRIPTION OF THE EMBODIMENTS

First Embodiment

Figure 1:
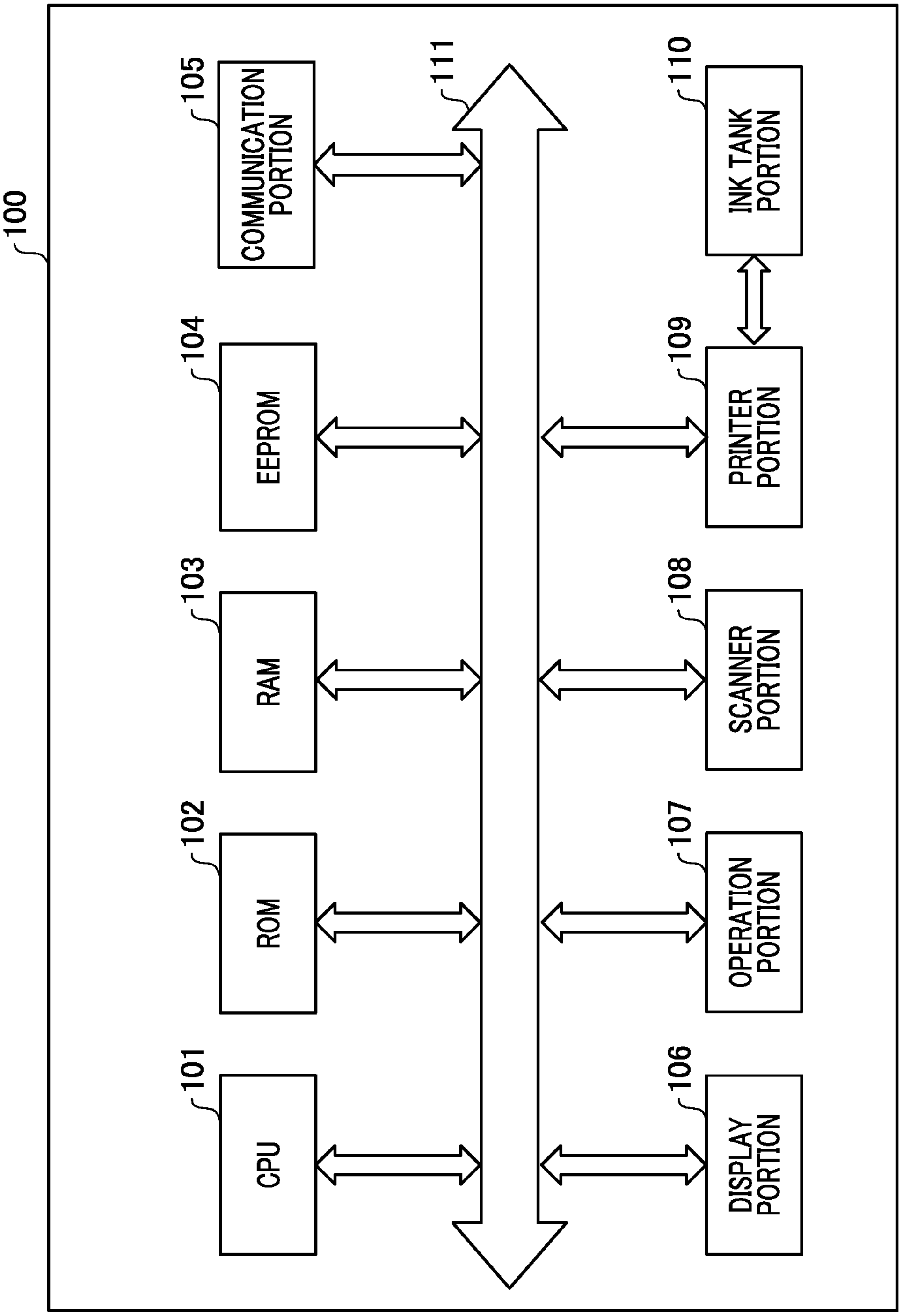
FIG. 1 is a diagram illustrating a hardware configuration of a printer.

FIG. 1 is a diagram illustrating a hardware configuration of a printer 100. The printer 100 according to an embodiment is an image forming device including an ink tank 110, into which ink from a liquid bottle that is a consumable material can be refilled, and adapted to perform printing by ejecting the ink supplied from the ink tank 110. Although a case where the printer 100 is a digital multifunction peripheral (MFP) having a print function and a scan function will be described as an example in the present embodiment, the printer 100 may be any printer as long as it has a function of forming an image by ejecting ink. For example, the printer 100 may be a single-function printer, a copy machine, a facsimile, or the like.

The printer 100 includes a CPU 101, a ROM 102, a RAM 103, and an EEPROM 104. The central processing unit (CPU) 101 controls each part in the printer 100. The read only memory (ROM) 102 stores various program codes. The random access memory (RAM) 103 temporarily stores image data and the like at the time of execution of various services and performs buffering. Also, the RAM 103 functions as a work area or the like of the CPU 101. The CPU 101 comprehensively controls each part connected to a system bus 111 and controls the entire printer 100 by executing a program stored in the ROM 102.

The electrically erasable programmable read-only memory (EEPROM) 104 is a non-volatile memory and stores various kinds of data. The data stored in the EEPROM 104 is, for example, shipping destination information of the printer 100, an ink bottle record, setting of a language displayed on a display portion 106, and the like. Details of the ink bottle record will be described later by using FIG. 7.

The printer 100 further includes a communication portion 105, the display portion 106, and an operation portion 107. The communication portion 105 is connected to an external device via a USB or a network and performs communication with the external device. The RAM 103 also temporarily stores image data and the like that the communication portion 105 receives from the external device. The display portion 106 includes, for example, a liquid crystal display and displays letters, figures, indicators, and the like. The display portion 106 is not limited to the liquid crystal display and can also be configured by using an LED or another display machine. Examples of information displayed on the display portion 106 include setting information of the printer 100, information regarding ink accommodated in each ink tank, and the like. The information regarding ink includes information regarding the remaining amount of the ink accommodated in the ink tank, information regarding an instruction to refill ink, and the like. The display on the display portion 106 is controlled by the CPU 101. The operation portion 107 includes a switch, a hard key, and the like for allowing a user to perform various input operations and receives input operations from the user. Additionally, it is also possible to adopt a mode in which the display portion 106 performs a function as the operation portion 107 for performing input operations like a touch panel. It is possible to configure a GUI that allows the user to perform operations as if the user were able to operate the screen displayed on the touch panel directly by associating input coordinates with display coordinates on the touch panel.

Also, the printer 100 includes a scanner portion 108, a printer portion 109, and an ink tank 110. In the printer 100, a print function is realized by the printer portion 109, and a scanning function is realized by the scanner portion 108. The printer portion 109 prints an image on a recording medium such as a print sheet by an inkjet scheme on the basis of image data received from the outside, image data read from the scanner portion 108, and the like. The printer portion 109 includes an inkjet head, and ink which is a consumable material is supplied from the ink tank 110 to the inkjet head via a tube. Also, the printer portion 109 manages ink information and sheet information. The ink information is information regarding ink used by the printer 100 and includes information regarding the remaining amount of ink in the ink tank 110. The sheet information is information regarding sheets used by the printer 100 and includes information regarding the number of mounted sheets and information regarding the number of printed sheets. The scanner portion 108 optically reads an original document set in an original document table 201, converts the original document into electronic data, and transmits it to an external device via a network, or copies it. The aforementioned parts are respectively connected to each other with the system bus 111 and can transmit and receive data to and from each other. The ink tank 110 stores ink therein. The ink is refilled from an ink bottle into the ink tank 110.

Figure 2:
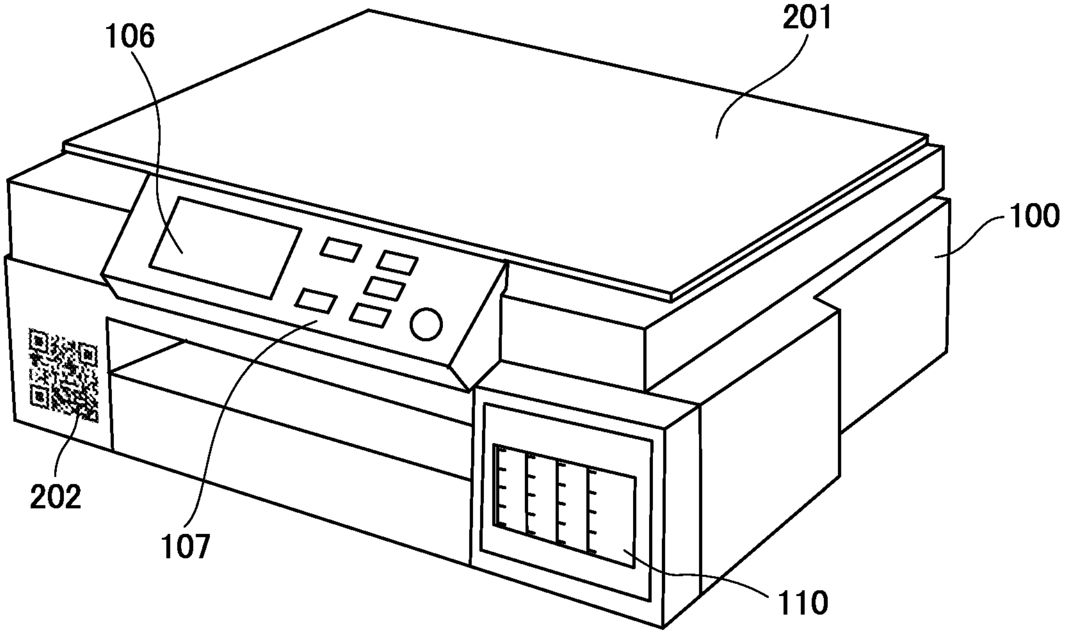
FIG. 2 is a diagram illustrating an appearance of the printer.

FIG. 2 is a diagram illustrating an appearance of the printer 100. The printer 100 includes the display portion 106, the operation portion 107, the ink tank 110, and the original document table 201. Also, a QR code 202 is applied (attached) to the printer 100. Note that although the ink tank 110 is seen from the outside and is configured such that the remaining amount of ink can be visually checked by the user in the example illustrated in FIG. 2, the ink tank 110 may be provided inside the printer 100 and may be disposed at a position at which the ink tank 110 is not seen from the outside.

The QR code 202 is a code image in which a printer serial ID for identifying the printer is coded. In the QR code 202, not only the printer serial ID but also a product name, an URL of a server that is a connection destination, activation information that is read by a mobile terminal to start a corresponding application, performance of the printer, and the like may be additionally coded. Also, a plurality of QR codes for each piece of the aforementioned information may be disposed on the printer 100. Note that although the case where the code image is a QR code will be described as an example in the present embodiment, the present disclosure is not limited thereto, and the code image may be a two-dimensional code such as a barcode, for example. Also, although the example in which the QR code 202 is attached to the surface of the printer 100 will be described in the present embodiment, a mode in which the QR code 202 is displayed on the display portion 106 may also be adopted.

Figure 3A:
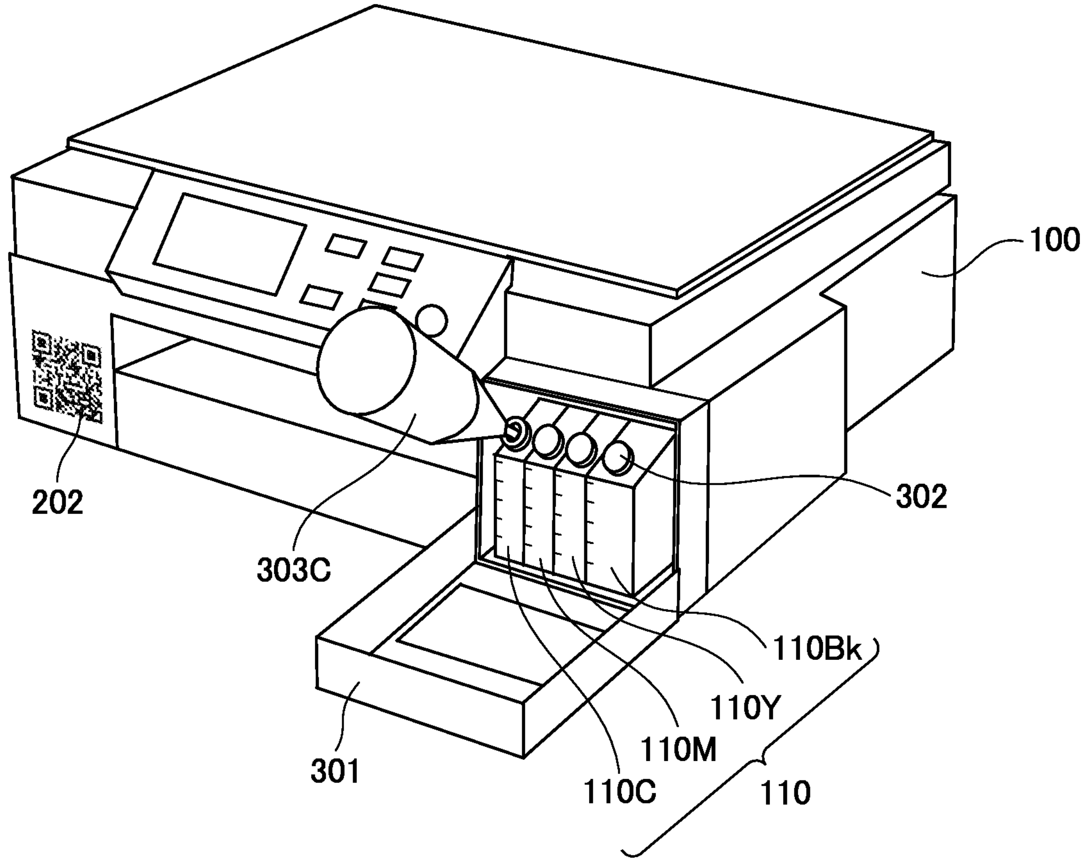
FIGS. 3A and 3B are diagrams for explaining an ink tank and ink.
Figure 3B:
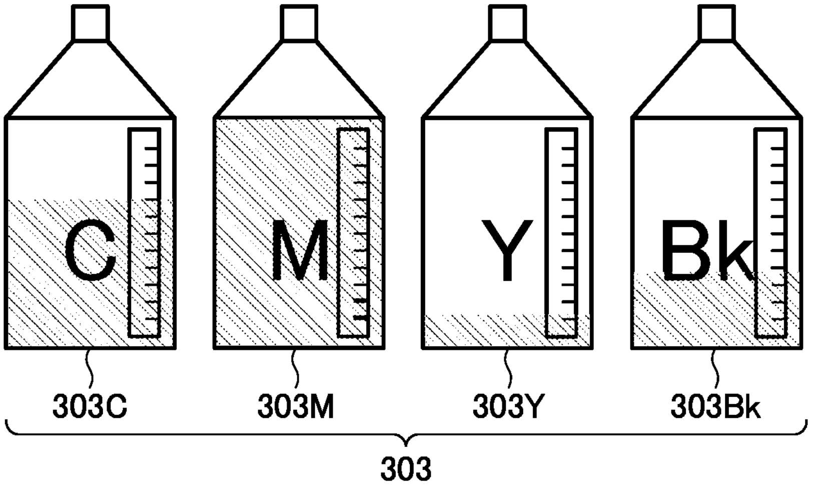

FIGS. 3A and 3B are diagrams for explaining the ink tank and the ink. FIG. 3A is a diagram for explaining a method of refilling the ink. If an ink tank cover 301 of the printer 100 is opened, then it is possible to access the ink tank 110. The printer 100 can eject a plurality of types of ink with different colors and record a color image on a recording medium. Therefore, the ink tank 110 is provided with four types of ink tanks to accommodate ink of four colors, namely yellow, cyan, magenta, and black. In the following description, letters C for cyan, M for magenta, Y for yellow, and Bk for black will be applied in order to simply denote the four colors. The ink tank 110 includes an ink tank 110C for accommodating cyan-colored ink, an ink tank 110M for accommodating magenta-colored ink, an ink tank 110Y for accommodating yellow-color ink, and an ink tank 110Bk for accommodating black-color ink. Each of the ink tank 110C, the ink tank 110M, the ink tank 110Y, and the ink tank 110Bk includes an ink inlet port 302. A cap at the inlet port 302 is opened, and the ink is supplied from an ink bottle 303 into the ink tank 110. The inlet port 302 of the ink has a different shape for each color such that it is not possible to refill ink from the ink bottle of a different color in this mechanism. Also, the inlet ports 302 may also be produced with differences in shape not only for each color but also for inks of different compositions which change in color when mixed to guarantee image quality. Note that although the example in which four types of ink tanks are provided will be described in the present embodiment, the number of ink tanks may be one or more.

FIG. 3B is a diagram for explaining an ink bottle. The ink bottle 303 is a container of ink which is a consumable material. The ink bottle 303 includes an ink bottle 303C in which the cyan-colored ink is placed, an ink bottle 303 in which the magenta-color ink is placed, an ink bottle 303Y in which the yellow-color ink is placed, and the ink bottle 303Bk in which the black-color ink is placed. When the ink tank 110C for accommodating the cyan-color ink is filled with ink, ink is supplied from the ink bottle 303C in which the cyan-color ink is placed.

Figure 4:
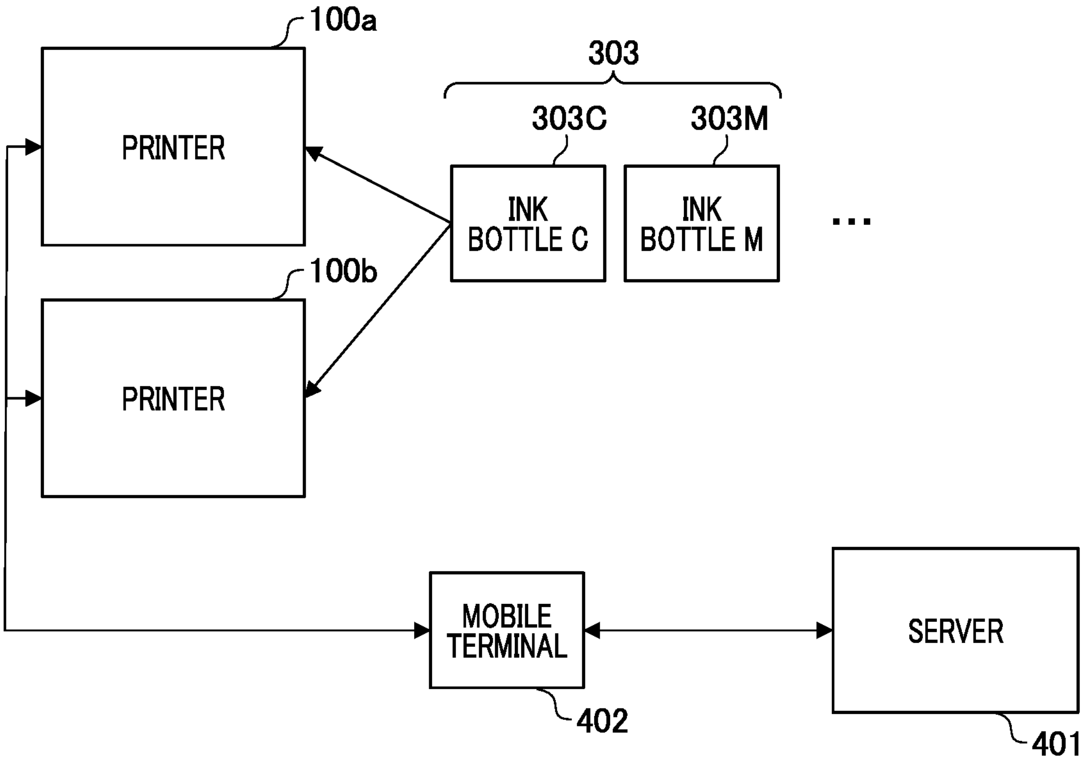
FIG. 4 is a diagram illustrating a configuration of a system according to a first embodiment.

FIG. 4 is a diagram illustrating a configuration of a system according to a first embodiment. The system is a system that requests delivery of the ink bottle 303 from a delivery service in accordance with the remaining amount of ink or the amount of used ink and realizes automatic delivery of the ink bottle 303 and includes a plurality of printers 100, a mobile terminal 402, and a server 401. The printers 100 are recording devices of an ink bottle scheme of refilling ink by using the ink bottles 303. The plurality of printers 100 (for example, a printer 100*a* and a printer 100*b*) in the system share the ink bottle 303 that is a container of a consumable material. Therefore, ink is supplied from the ink bottle 303 to both the printer 100*a* and the printer 100*b*. Information regarding the ink consumed by each printer 100 is sent from each printer 100 to the mobile terminal 402.

The mobile terminal 402 is a network device that has a communication function such as a smartphone or a tablet terminal, for example. Communication between the printers 100 and the mobile terminal 402 may be configured of, for example, any one of a wireless LAN, Bluetooth, a cellular network (for example, LTE or 5G), the Internet line, infrared communication, and wired communication, or a combination thereof. Also, the mobile terminal 402 includes a camera portion that is an imaging section that captures an image. The server 401 is an information processing device that provides an ink bottle automatic delivery service, that is, a delivery service of delivering the container of the consumable material that is used by the devices. A new ink bottle is automatically delivered to the user who is subscribed to the ink bottle automatic delivery service when the amount of consumed ink exceeds a specific threshold value. Communication between the mobile terminal 402 and the server 401 may be configured of any one of a communication network such as a LAN or a WAN, a cellular network, a wireless network, a telephone line, and a dedicated digital line, or a combination thereof. In other words, it is only necessary for data to be able to be transmitted and received according to the configuration, and any scheme can be employed as a communication scheme. Also, the delivery service may be realized not only by the server 401 but also by a virtual machine (cloud service) using resources provided by a data center including one or more information processing devices in addition to the information processing devices or a combination thereof.

Figure 5:
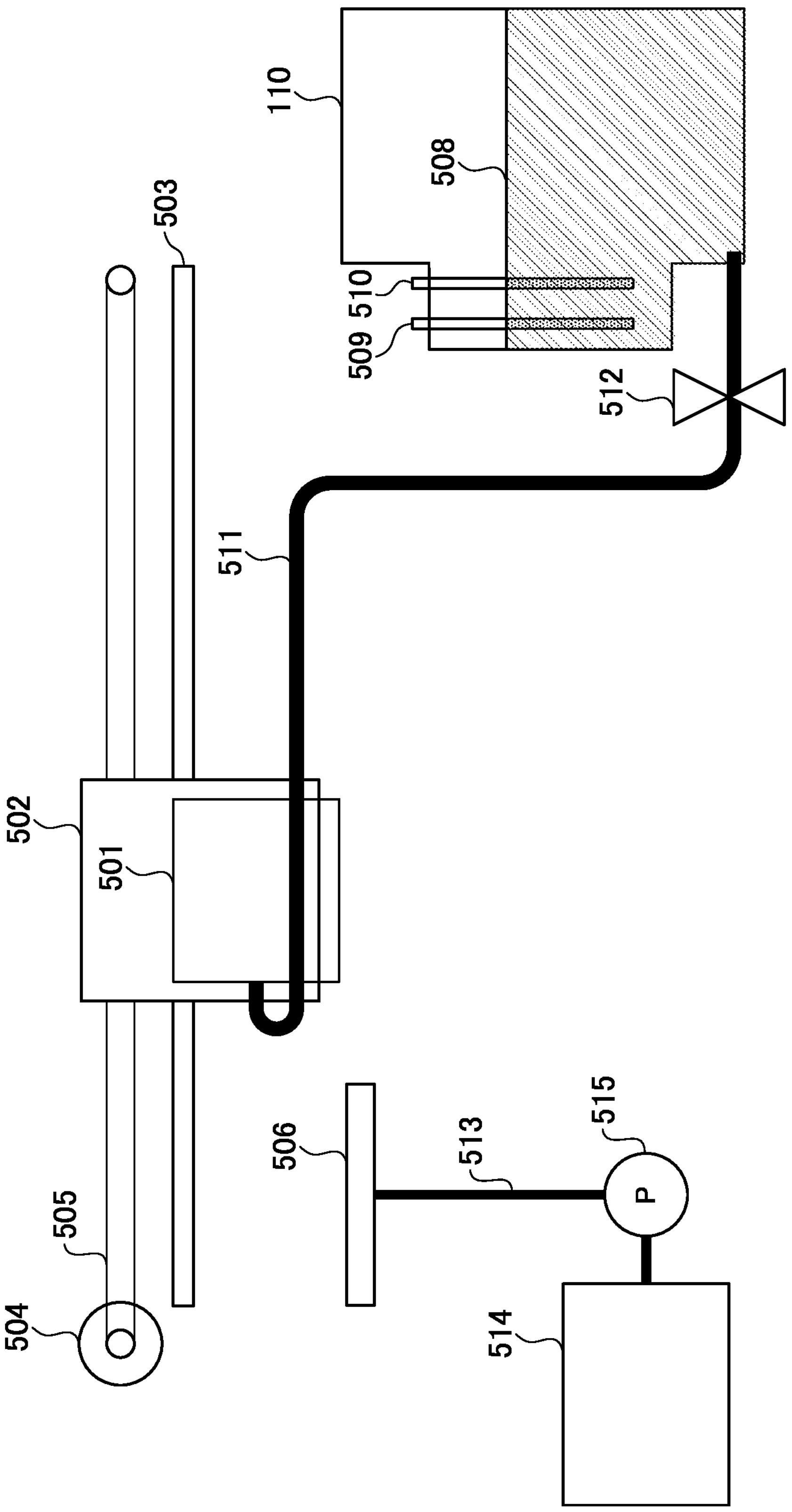
FIG. 5 is a diagram for explaining a mechanism of ink supply.

FIG. 5 is a diagram for explaining a mechanism of ink supply. Note that although a configuration of only one color will be described here for easy understanding, the present disclosure is not limited to the configuration of only one color. A recording head 501 is a recording head of an inkjet scheme and ejects ink onto a recording medium such as a sheet. The recording head 501 is mounted on a carriage 502. A guide shaft 503 is a guide to support the carriage 502. A carriage motor 504 is a motor that drives the carriage 502. A belt 505 is a transmission mechanism of transmitting a drive force of the carriage motor 504 to the carriage 502. The belt 505 is rotated by the carriage motor 504 being driven, the carriage 502 coupled to the belt 505 is caused to move leftward and rightward in FIG. 5 along the guide shaft 503, and the recording head 501 is caused to move to a recording position. The driving of the carriage motor 504, that is, the position of the recording head 501 is controlled by the CPU 101.

The ink tank 110 stores ink 508. Also, a supply tube 511 is attached to the ink tank 110. The supply tube 511 is a tube for supplying the ink from the ink tank 110 to the recording head 501. The ink 508 is supplied from the ink tank 110 to the recording head 501 via the supply tube 511 and is then ejected. A choke valve 512 is provided in the middle of the supply tube 511. The choke valve 512 blocks or opens a flow path between the ink tank 110 and the recording head 501. Specifically, the ink is temporarily dammed by closing the choke valve 512 provided in the middle of the supply tube 511, the pressure on the side of the recording head 501 from the choke valve 512 in the supply tube 511 is reduced such that the pressure in the internal space therein becomes a negative pressure. Then, the choke valve 512 is opened in this state, and the ink is supplied to the recording head 501.

Also, a pair of an electrode 509 and an electrode 510 are provided in the ink tank 110 in a state where the electrodes can come into contact with the ink 508. The CPU 101 obtains a voltage or the like that is a potential difference at the time of an application of a voltage to the electrode 509 and the electrode 510 and at the time of ending the application, compares the electrical information with a threshold value that is a reference value, and thereby measures the remaining amount of ink in the ink tank 110. Additionally, the CPU 101 can also calculate the amount of consumed ink from a difference between the remaining amount of ink when the count of the amount of consumed ink is initialized and the current remaining amount of ink. Note that the method of measuring the remaining amount and the amount of consumed ink performed by the CPU 101 is not limited thereto. For example, the amount of used ink and the remaining amount may be estimated on the basis of print data.

The cap unit 506 is a cap that comes into close contact with an ejection surface of the recording head 501 to prevent the ejection surface of the recording head 501 from being dried and being not able to eject ink. Also, the cap unit 506 also has a function as a recovery section that performs recovery operations such as empty ejection and suctioning recovery on the nozzle array of the recording head 501. A discharge tube 513 is a tube for discharging the ink to a discarded ink absorber 514. A suctioning pump 515 is a pump that suctions the ink in the recording head 501 and the supply tube 511 and discharges the ink to the discarded ink absorber 514. Specifically, the suctioning pump 515 causes the ejection surface of the recording head 501 to come into close contact with the cap unit 506, reduces the pressure in the cap unit 506, and thereby suctions the ink in the recording head 501 and the supply tube 511. The suctioning pump 515 can thus perform supply of the ink to the recording head 501 and the suctioning recovery operations of discharging air bubbles inside the recording head 501 and the supply tube 511 along with the ink. The discarded ink absorber 514 stores the ink passing, suctioned, and discharged through the discharge tube 513.

Figure 6:
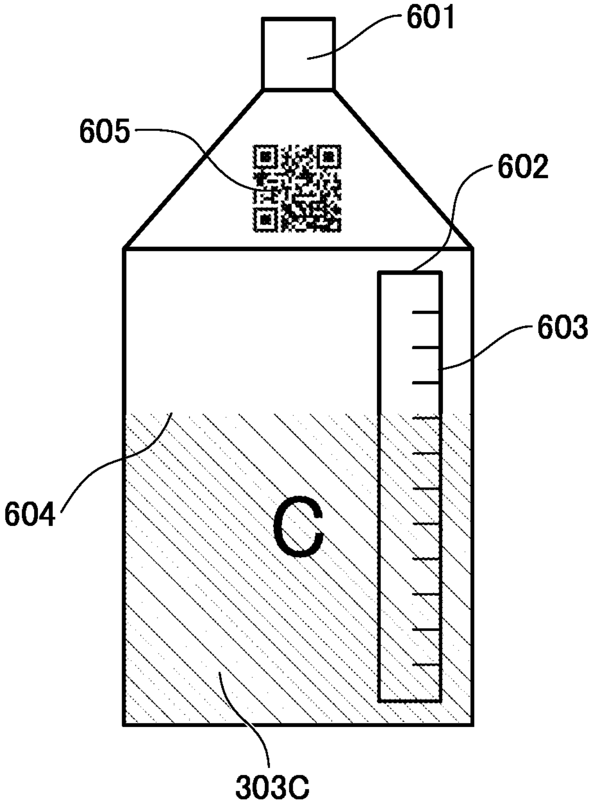
FIG. 6 is a diagram illustrating an appearance of an ink bottle.

FIG. 6 is a diagram illustrating an appearance of an ink bottle. Here, the ink bottle 303 will be described by exemplifying an ink bottle 303C. An outlet port 601 is an outlet port of ink 604 and has a structure in which refilling of the ink 604 is started when the distal end thereof is combined with the inlet port 302. The shape of the outlet port 601 differs for each color to prevent the ink of an incorrect color from being refilled. Also, the outlet port 601 is produced with a change in shape not only for each color but also to guarantee image quality for ink which exhibits a different tone when it is mixed due to a different composition of the ink.

A small window 602 is a small window for the user to visually check the remaining amount of the ink 604. The small window 602 is made of a transparent member, and the small window 602 is provided with a scale 603. On the other hand, a material of the ink bottle 303C other than the small window 602 is a material that does not completely transmit light in order to reduce an optical change in ink 604. The user can recognize the remaining amount of ink 604 in the ink bottle 303C by reading the scale 603 of the small window 602 and the surface of the ink 604 together. Note that although the mechanism of recognizing the remaining amount through the small window 602 has been described, the entire bottle may be transparent in a case of an ink of a material that is unlikely to be optically changed.

Also, a QR code 605 is applied to the surface of the ink bottle 303C. The QR code 605 is a code image in which information necessary to manage the ink bottle is incorporated. The information necessary to manage the ink bottle includes at least a serial ID of the ink bottle for uniquely identifying the ink bottle. Also, the information necessary to manage the ink bottle may include information related to the ink bottle such as an ink model, an ink color, the initial remaining amount, and a manufacturing date, connection information (URL) to a server that manages the ink bottle, an activation information of the application that manages the ink bottle, and the like. Note that although the case where the code image is a QR code will be described as an example in the present embodiment, the present disclosure is not limited thereto, and the code image may be a two-dimensional code such as a barcode, for example.

Figure 7:
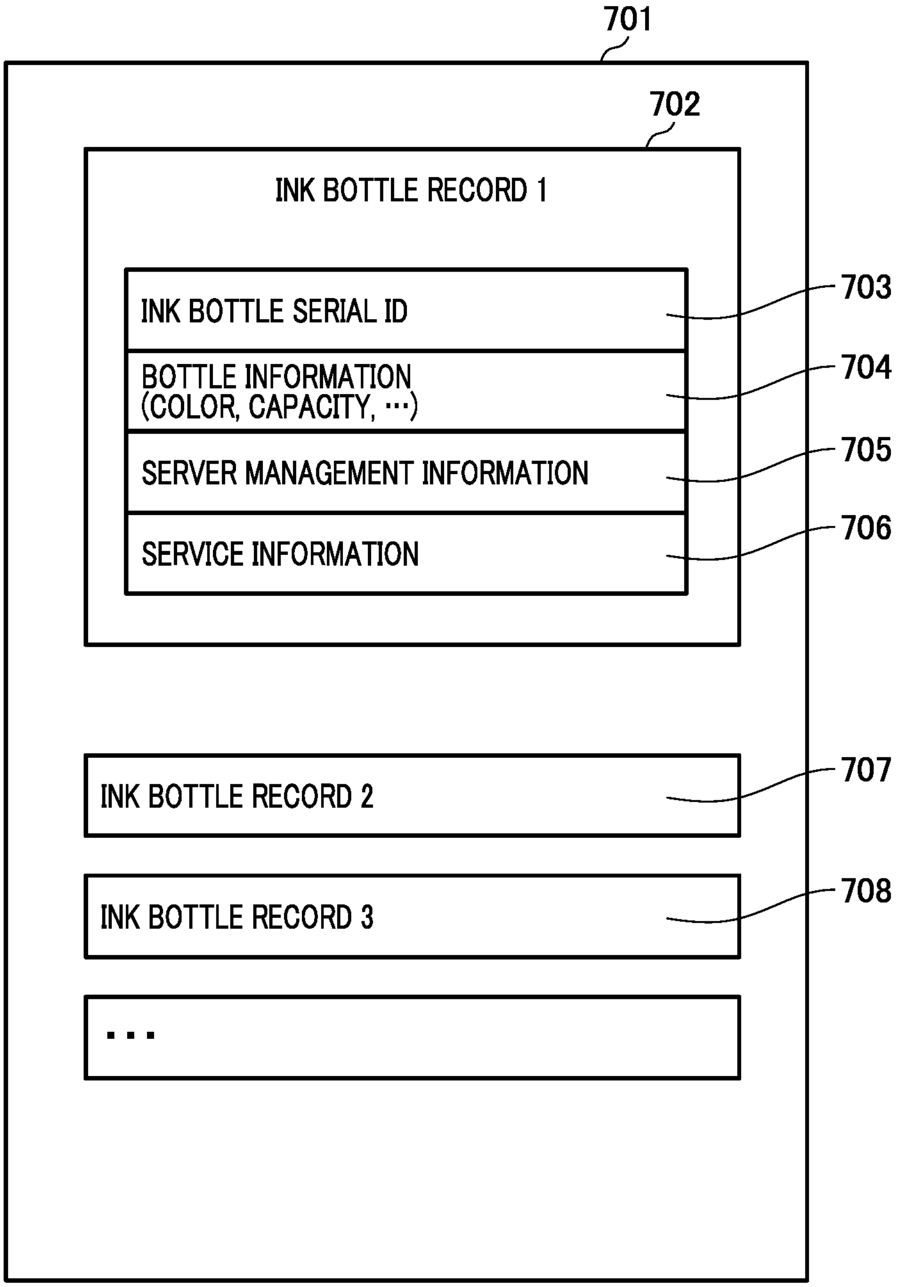
FIG. 7 is a diagram for explaining an ink bottle record managed by the printer.

FIG. 7 is a diagram for explaining an ink bottle record managed by each printer 100. An ink bottle record 701 is history information of ink bottles used by the printer 100 and is managed by the EEPROM 104 of the printer 100 and the server 401. The ink bottle record 701 holds an ink bottle record for each ink bottle (an ink bottle record 702, an ink bottle record 707, and an ink bottle record 708) in the form of a list.

The ink bottle record 702 will be described as an example of the ink bottle record for each ink bottle. The ink bottle record 702 includes a serial ID 703 of the ink bottle, bottle information 704, server management information 705, and service information 706. The serial ID 703 of the ink bottle is information for uniquely identifying the ink bottle. The bottle information 704 stores information such as an ink color, ink capacity, a manufacturing data of the ink, and the like. The server management information 705 stores connection information to the server 401, security information for establishing connection, and information such as a flag indicating whether registration in the server has been made. The service information 706 stores information such as a subscription condition of the ink bottle automatic delivery service and a previous delivery date, for example.

Figure 8:
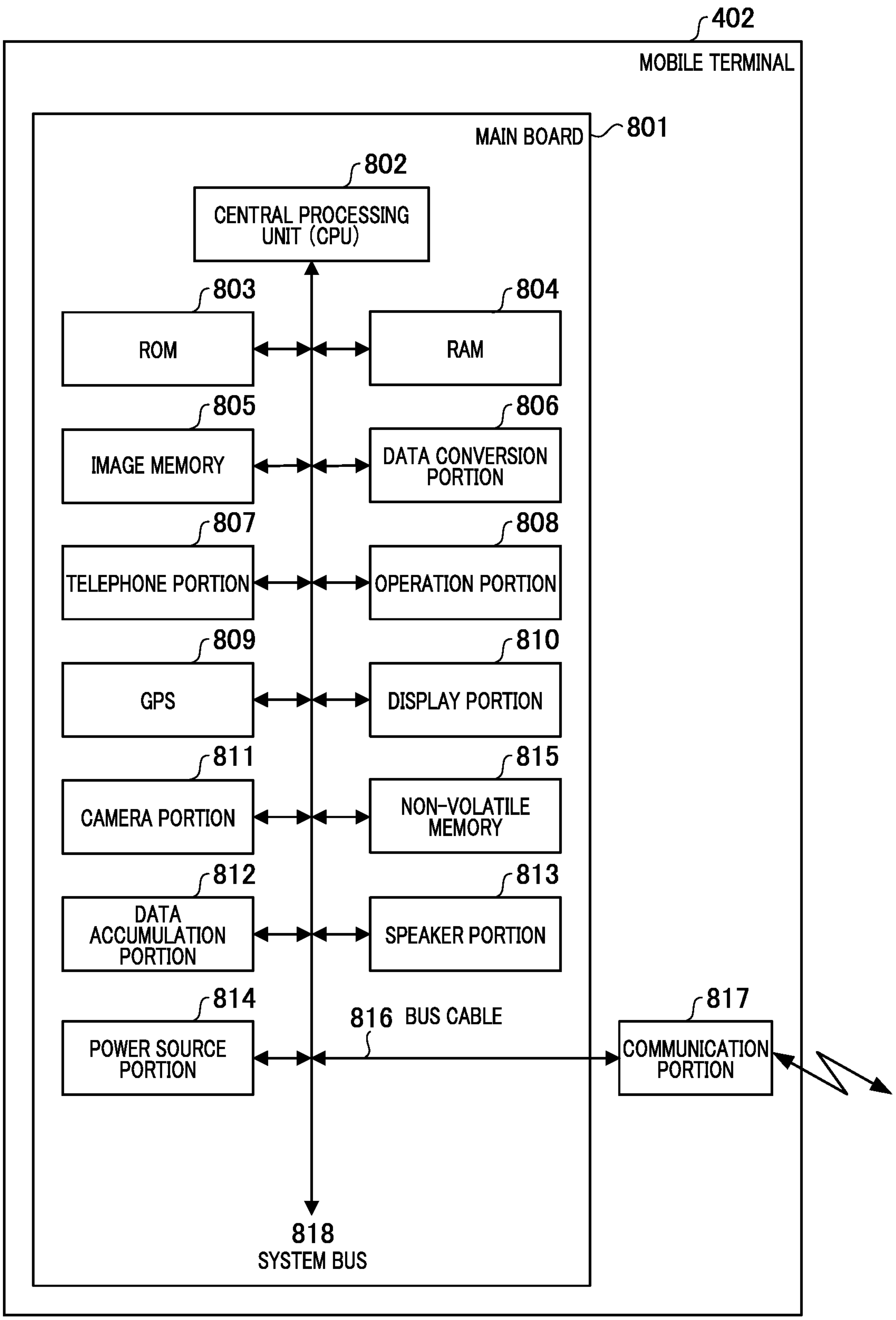
FIG. 8 is a diagram illustrating a hardware configuration of a mobile terminal.

FIG. 8 is a diagram illustrating a hardware configuration of the mobile terminal 402. The mobile terminal 402 includes a main board 801 that performs main control of the mobile terminal 402 and a communication portion 817 that performs communication with the outside. The main board 801 includes a CPU 802, a ROM 803, and a RAM 804. The communication portion 817 is a unit for performing data communication with the outside, such as a WLAN unit that performs WLAN communication, for example. The communication portion 817 is connected to a system bus 818 of the main board 801 via a bus cable 816.

The CPU 802 controls the entire mobile terminal 402. The ROM 803 stores a control program, an incorporated operating system (OS) program, and the like executed by the CPU 802. Each control program stored in the ROM 803 performs basic software control such as scheduling, task switching, and the like under management of the incorporated OS stored in the ROM 803. The RAM 804 is configured of a static RAM (SRAM) or the like, stores program control variables and the like, and stores setting values registered by the user, management data of the mobile terminal 402, and the like. Additionally, the RAM 804 is provided with buffer regions for various works. The CPU 802 comprehensively controls each part connected to a system bus 818 and controls the entire mobile terminal 402 by executing the programs stored in the ROM 803.

The main board 801 further includes an image memory 805, a data accumulation portion 812, a non-volatile memory 815, a data conversion portion 806, a telephone portion 807, an operation portion 808, a GPS 809, and a display portion 810. The image memory 805 includes a dynamic RAM (DRAM) or the like and temporarily stores image data received via the communication portion 817 and image data read from the data accumulation portion 812 in order to process them by the CPU 802. The non-volatile memory 815 includes a flash memory and the like and stores data that it is desired to store even after the power source of the mobile terminal 402 is turned off. For example, information regarding the printer 100 read by the application and the like are stored in the non-volatile memory 815. The data accumulation portion 812 stores image data captured by a camera portion 811. Note that the memory configuration of the mobile terminal 402 is not limited to the configuration described above. For example, the image memory 805 and the RAM 804 may be shared, or data backup in the data accumulation portion 812 or the like may be performed. Also, although the example in which the DRAM is used as the image memory 805 has been described in the present embodiment, a non-volatile memory, an attachable/detachable hard disk, or the like may be used.

The data conversion portion 806 performs analysis of a page description language (PDL) and the like and data conversion such as color conversion and image conversion. The telephone portion 807 controls a telephone line and realizes communication through a telephone by processing audio data input and output via a speaker portion 813. The operation portion 808 receives input operations from the user. The display portion 810 is a liquid crystal display or an organic EL display, for example, and displays various input operations and operation conditions, status conditions, and the like of the mobile terminal 402. Note that the operation portion 808 and the display portion 810 may be integrated like a touch panel. It is possible to configure a GUI that allows the user to perform operations as if the user were able to operate directly the screen displayed on the touch panel by associating input coordinates with display coordinates on the touch panel. A global positioning system (GPS) 809 acquires current position information such as a latitude and a longitude.

The main board 801 further includes the camera portion 811, the speaker portion 813, and a power source portion 814. The camera portion 811 includes an imaging optical system and an imaging sensor, uses the imaging sensor to perform photoelectric conversion of light that is incident via the imaging optical system, and acquires an image. The image captured by the camera portion 811 is saved in the data accumulation portion 812. Also, it is possible to acquire the information stored in the code image by the camera portion 811 reading the code image such as a QR code. The speaker portion 813 inputs and outputs sound. For example, the speaker portion 813 inputs or outputs audio for a telephone function or outputs sound on the basis of an alarm notification. The power source portion 814 controls a power source and a battery of the mobile terminal 402. Each component of the main board 801 and the communication portion 817 are connected to each other via the system bus 818 managed by the CPU 802.

Figure 9:
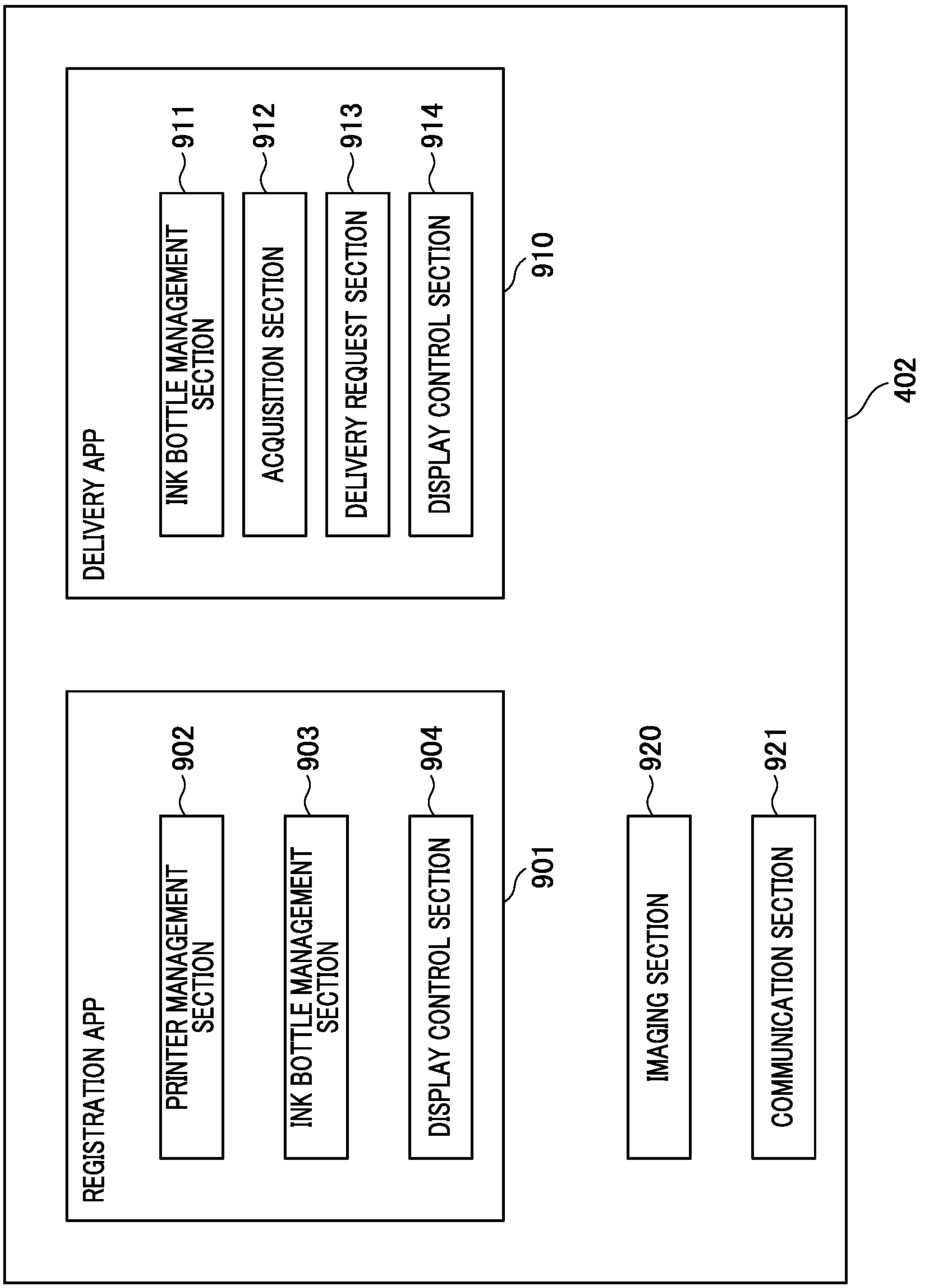
FIG. 9 is a diagram illustrating a software configuration of the mobile terminal.

FIG. 9 is a diagram illustrating a software configuration of the mobile terminal 402. The mobile terminal 402 includes a registration APP 901, a delivery APP 910, an imaging section 920, and a communication section 921. Each section illustrated in FIG. 9 is realized by the CPU 802 reading and executing, in the RAM 804, the control program stored in the memory such as the ROM 803. Note that although the example in which two applications, namely the registration APP 901 and the delivery APP 910 are registered in the mobile terminal 402 will be described in the present embodiment, the registration APP 901 and the delivery APP 910 may be realized as one application. The imaging section 920 controls the camera portion 811 and captures and acquires an image. The communication section 921 controls communication with external devices (for example, the printers 100, the server 401, and the like) via the communication portion 817.

The registration APP 901 is an application for registering printer information and ink bottle information. In the mobile terminal 402 and the server 401, the printer information is managed as a printer record (FIG. 10), and the ink bottle information is managed as an ink bottle record (FIG. 11). The registration APP 901 includes a printer management section 902, an ink bottle management section 903, and a display control section 904. The printer management section 902 of the registration APP 901 acquires information regarding the printers 100 and registers and manages the information as a printer record. The processing of registering the information regarding the printers 100 will be described later by using FIG. 12. The ink bottle management section 903 of the registration APP 901 acquires the information regarding the ink bottle 303 and registers and manages the information as an ink bottle record. The processing of registering the information regarding the ink bottle 303 will be described later by using FIG. 14. The display control section 904 of the registration APP 901 controls display on the display portion 810 of the screen provided by the registration APP 901.

The delivery APP 910 is an application that provides a request for delivery to the delivery service of the ink bottle on the basis of the total amount of consumption obtained by summing the amounts of consumed ink or the remaining amounts of the ink. The delivery APP 910 includes an ink bottle management section 911, an acquisition section 912, a delivery request section 913, and a display control section 914. The ink bottle management section 911 manages the ink bottle record registered by the registration APP 901. The acquisition section 912 acquires information including the amounts of consumed ink or the remaining amounts from the printers. The delivery request section 913 determines whether or not it is necessary to provide a request to deliver the ink bottle and provides the request for delivery to the delivery service on the basis of the information acquired by the acquisition section 912. The display control section 914 controls display on the display portion 810 of the screen provided by the delivery APP 910. The processing executed by the delivery APP 910 will be described later by using FIGS. 15 and 16.

Figure 10:
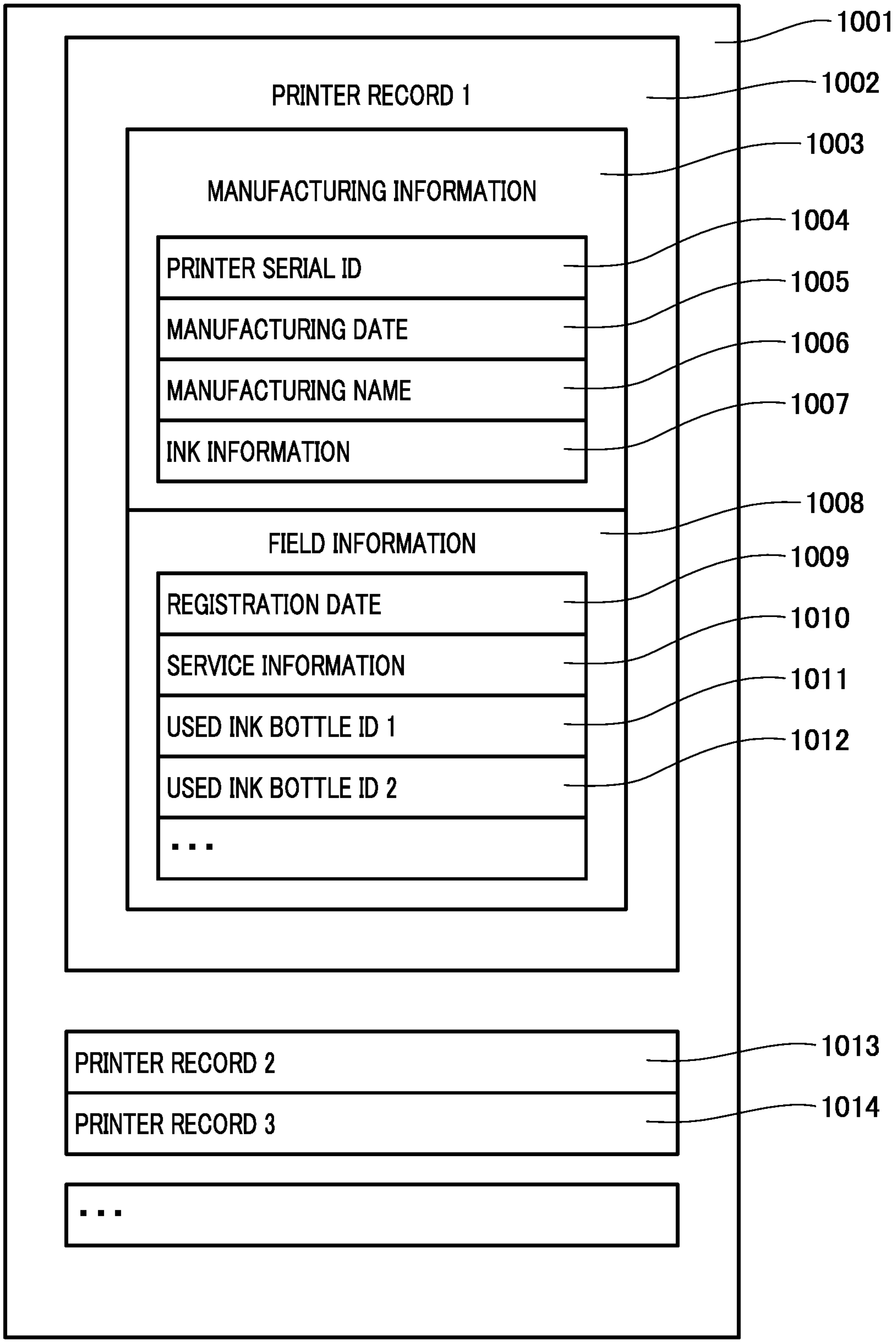
FIG. 10 is a diagram for explaining a printer record managed by the mobile terminal.
Figure 11:
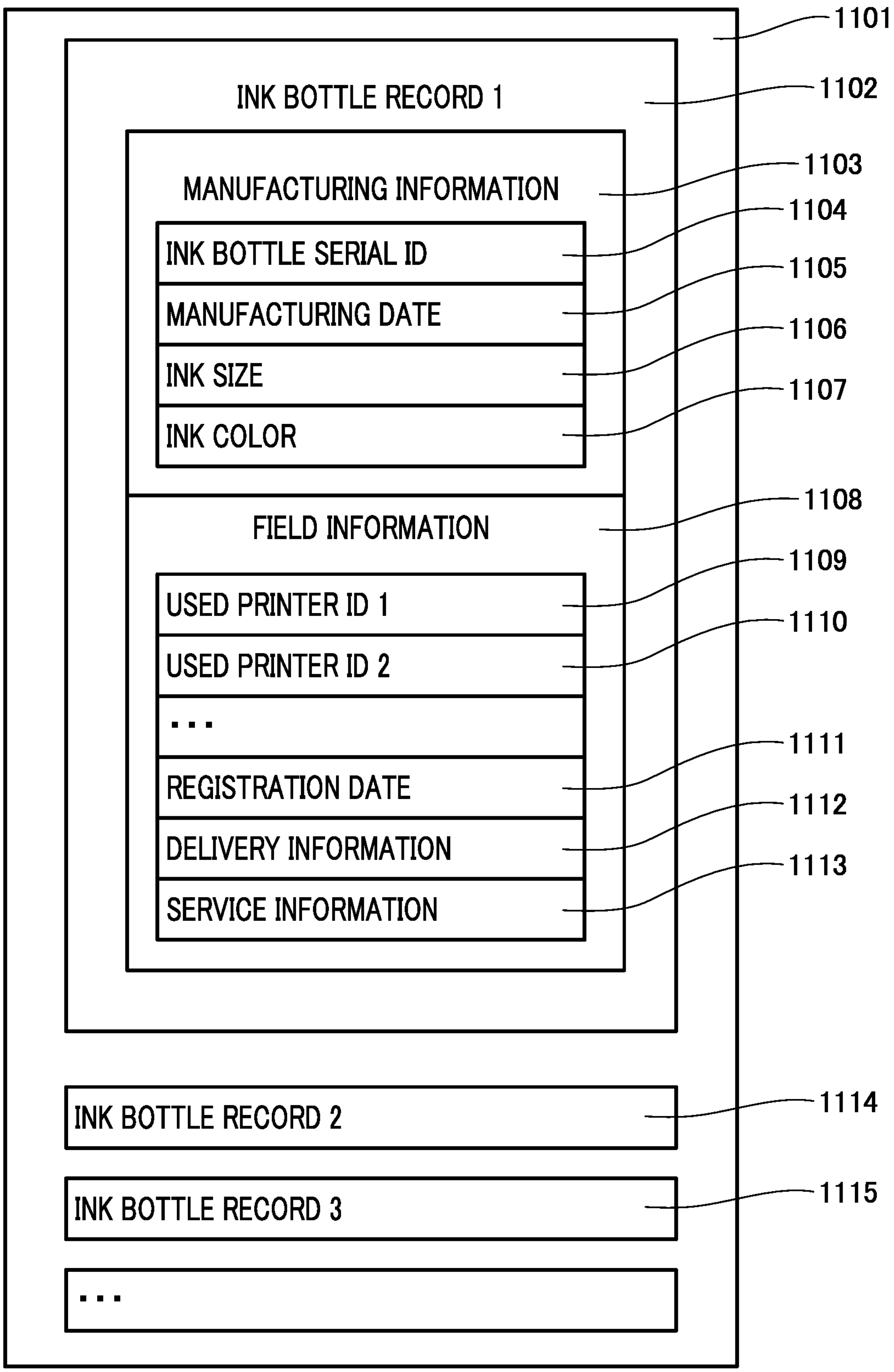
FIG. 11 is a diagram for explaining an ink bottle record managed by the mobile terminal.

FIG. 10 is a diagram for explaining a printer record. A printer record 1001 is a list of printer information managed by the mobile terminal 402 and is stored in the non-volatile memory 815. The printer record 1001 stores a printer record for each printer (a printer record 1002, a printer record 1013, and a printer record 1014) in the form of a list.

The printer record 1002 will be described as an example of the printer record for each printer. The printer record 1002 includes manufacturing information 1003 and field information 1008. The manufacturing information 1003 is information determined when the printer is manufactured. The manufacturing information 1003 includes a serial ID 1004 of the printer, a manufacturing date 1005, a product name 1006, and ink information 1007. The serial ID 1004 of the printer is information for uniquely identifying the printer and is numbered at the time of manufacturing. The manufacturing date 1005 is a date and time when the printer is manufactured. The product name 1006 is a product name of the printer. The ink information 1007 stores information regarding ink used by the printer.

The field information 1008 is information changed after the printer is used at the user destination. The field information 1008 includes a registration date 1009, service information 1010, and a used ink bottle ID 1011. The registration date 1009 stores the registration date on which the printer is registered. The service information 1010 stores a subscription condition of a service supporting the printer and a log indicating execution of the service. For example, the service information 1010 stores information such as a subscription condition of the ink bottle automatic delivery service and a previous delivery date. The service information 1010 stores information similar to the service information 706 in regard to the ink. Also, the service information 1010 may store unique information, and for example, a date and time when communication with the server is performed, information regarding a point service, and the like may be stored therein. The used ink bottle ID 1011 includes a serial ID that uniquely identifies the ink bottle used by the printer. The ID registered in the used ink bottle ID 1011 is information that is similar to the serial ID 703 of the ink bottle. In a case of a printer using a plurality of types of ink, a plurality of used ink bottle IDs are registered in accordance with the number of types of the ink like the used ink bottle ID 1012.

FIG. 11 is a diagram for explaining an ink bottle record managed by the mobile terminal 402. The ink bottle record is a list of ink bottle information managed by the mobile terminal 402 and is stored in the non-volatile memory 815. The ink bottle record 1101 stores an ink bottle record for each ink bottle (an ink bottle record 1102, an ink bottle record 1114, and an ink bottle record 1115) in the form of a list.

The ink bottle record 1102 will be described as an example of the ink bottle record for each ink bottle. The ink bottle record 1102 includes manufacturing information 1102 and field information 1108. The manufacturing information 1103 is information determined when the ink bottle is manufactured. The manufacturing information 1103 includes a serial ID 1104 of the ink bottle, a manufacturing date 1105, an ink size 1106, and an ink color 1107. The serial ID 1104 of the ink bottle is information for uniquely identifying the ink bottle and is numbered at the time of manufacturing. The manufacturing date 1105 is a date and time when the ink bottle 303 is manufactured. The ink size 1106 is information indicating the capacity of the ink bottle. The ink size 1106 may store actual capacity such as 100 ml, 200 ml, or 300 ml, for example, or may store the size of relative capacity such as large, middle, and small. The ink color 1107 is a color of the ink in the ink bottle and stores information indicating a specific color such as cyan, magenta, or yellow, for example.

The field information 1108 is information changed after the ink bottle is used at a user destination. The field information 1108 stores a used printer ID 1109, a registration date 1111, delivery information 1112, and service information 1113. The used printer ID 1109 stores a serial ID of the printer using the ink bottle. In a case where one ink bottle is used by a plurality of printers, serial IDs of the plurality of printers using the ink bottle are registered. In the example of the ink bottle record 1102, two used printer IDs, namely the used printer ID 1109 and the used printer ID 1110 are registered. The registration date 1111 stores a registration date on which the ink bottle is registered. The delivery information 1112 stores delivery information of the ink bottle. An initial state of the delivery information 1112 is "not yet delivered" and is updated when the request to deliver the ink bottle is provided. The timing at which the delivery information 1112 is updated will be described in FIG. 15. The service information 1113 includes information such as connection information (URL) to the ink bottle automatic delivery service, a service subscription condition, and a previous delivery time. The service information 1010 stores information that is similar to the service information 706 in regard to the ink. Also, the service information 1010 may store unique information, and for example, a date and time when communication with the server is performed, information regarding a point service, and the like may be stored therein. Note that the ink bottle record stored in the server 401 also has a structure that is similar to that of the ink bottle record held by the mobile terminal 402 described in FIG. 11.

Figure 12:
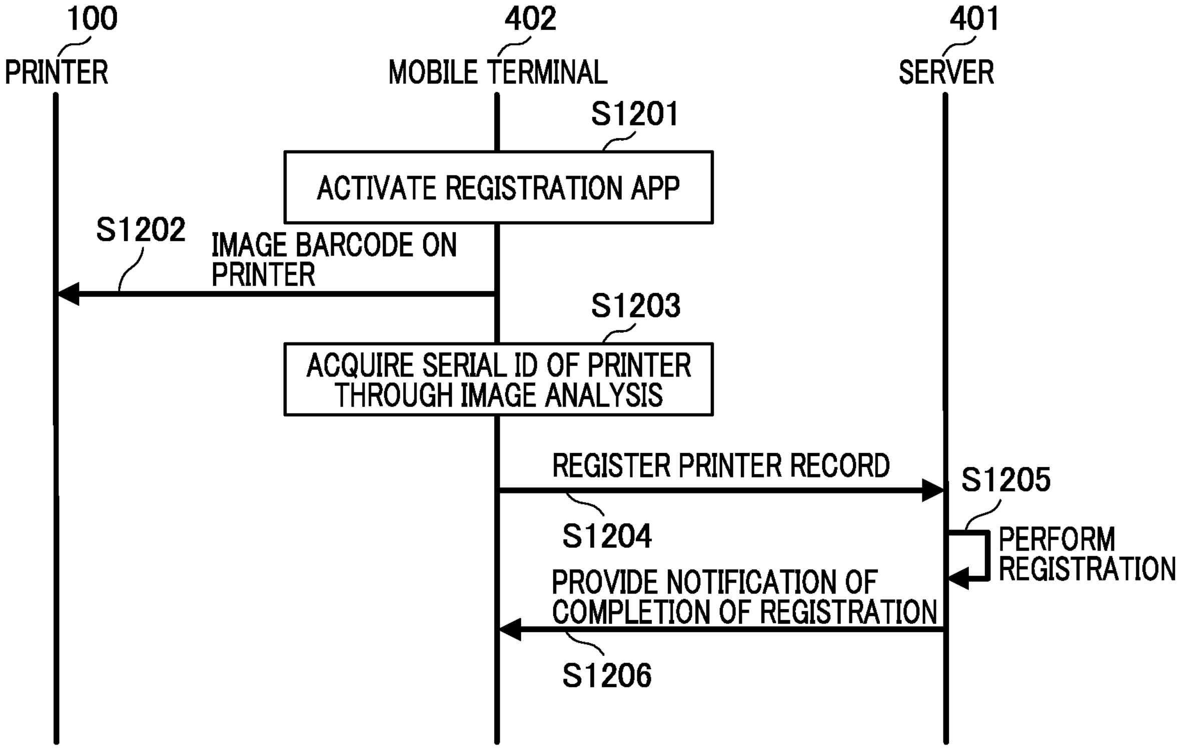
FIG. 12 is a sequence diagram illustrating processing of registering a printer.

FIG. 12 is a sequence diagram illustrating processing of registering the printer 100 in the server 401. In the present embodiment, the serial ID of the printer 100 that has not yet been registered is acquired by using the mobile terminal 402 and is registered in the server 401. The processing performed by the mobile terminal 402 illustrated in FIG. 12 is realized by the CPU 802 of the mobile terminal 402 reading and executing, in the RAM 804, the control program stored in a memory such as the ROM 803. FIGS. 13A to 13D are diagrams illustrating examples of display of the mobile terminal 402.

Figure 13A:
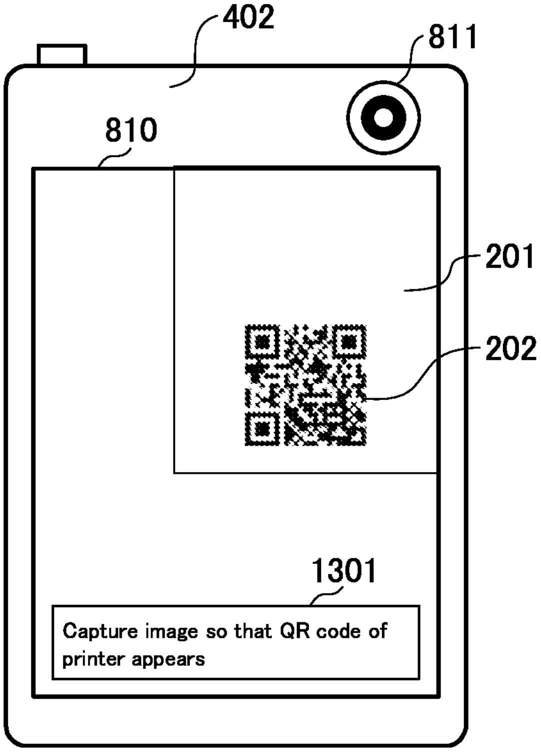
FIGS. 13A to 13D are diagrams illustrating examples of display on the mobile terminal.

S1201, the mobile terminal 402 activates the registration APP 901 on the basis of a user's instruction. In S1202, the registration APP 901 displays a screen for encouraging the user to image the QR code on the printer to be registered. The user images the QR code 202 on the printer 100 by the camera portion 811 of the mobile terminal 402 in accordance with an instruction from the registration APP 901. FIG. 13A is a diagram illustrating an example of display on the screen of the mobile terminal 402 when the QR code 202 on the printer 100 is imaged. The image of the QR code 202 for identifying the printer 100 capturing the image through the camera portion 811 and a guidance 1301 for providing an instruction for an imaging operation to the user are displayed on the display portion 810. In a case where the image of the QR code 202 is missed, or an imaging angle is not appropriate for reading the QR code 202, for example, an instruction to correct the imaging state is displayed as the guidance 1301 for the user.

Figure 13B:
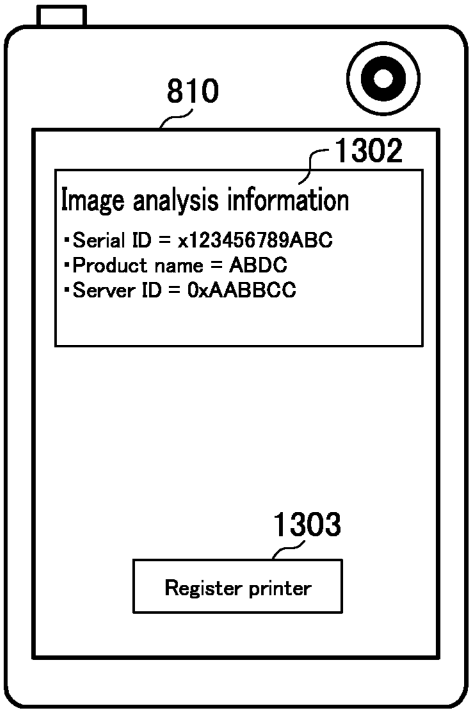

In S1203, the printer management section 902 of the registration APP 901 analyzes the captured image of the QR code 202 and acquires information regarding the printer including the serial ID of the printer 100. For example, the registration APP 901 may acquire the manufacturing information such as a product name, a manufacturing date, and ink information of the printer 100, the field information, and the like from the QR code 202 in addition to the serial ID of the printer 100. Furthermore, the registration APP 901 may acquire connection information of the server 401 from the QR code 202. Then, the registration APP 901 registers the acquired information in the printer record and stores the printer record in the non-volatile memory 815. FIG. 13B is a diagram illustrating an example of a screen that displays a result of analyzing the QR code 202. Image analysis information 1302 is displayed on the display portion 810. A result of analyzing the QR code 202 is displayed in the image analysis information 1302. A serial ID, a product name, a connection destination server ID, and the like of the printer, for example, are displayed in the image analysis information 1302. Also, in a case where the printer from which the QR code 202 is read has not yet been registered, a registration button 1303 may be displayed. The registration button 1303 is a button for registering the printer displayed in the image analysis information 1302 in the printer record 1001.

In S1204, the printer management section 902 of the registration APP 901 sends the printer record generated in S1203 as information regarding the printer 100 to be registered to the server 401. In S1205, the server 401 registers the printer record acquired from the mobile terminal 402. In S1206, the server 401 notifies the mobile terminal 402 of completion of registration of the printer information, and the registration APP 901 that has received the notification ends this flow. Through the above processing, it is possible to register the printer 100 that has not yet been registered in the server 401 as a target of the service provided by the server 401.

Figure 14:
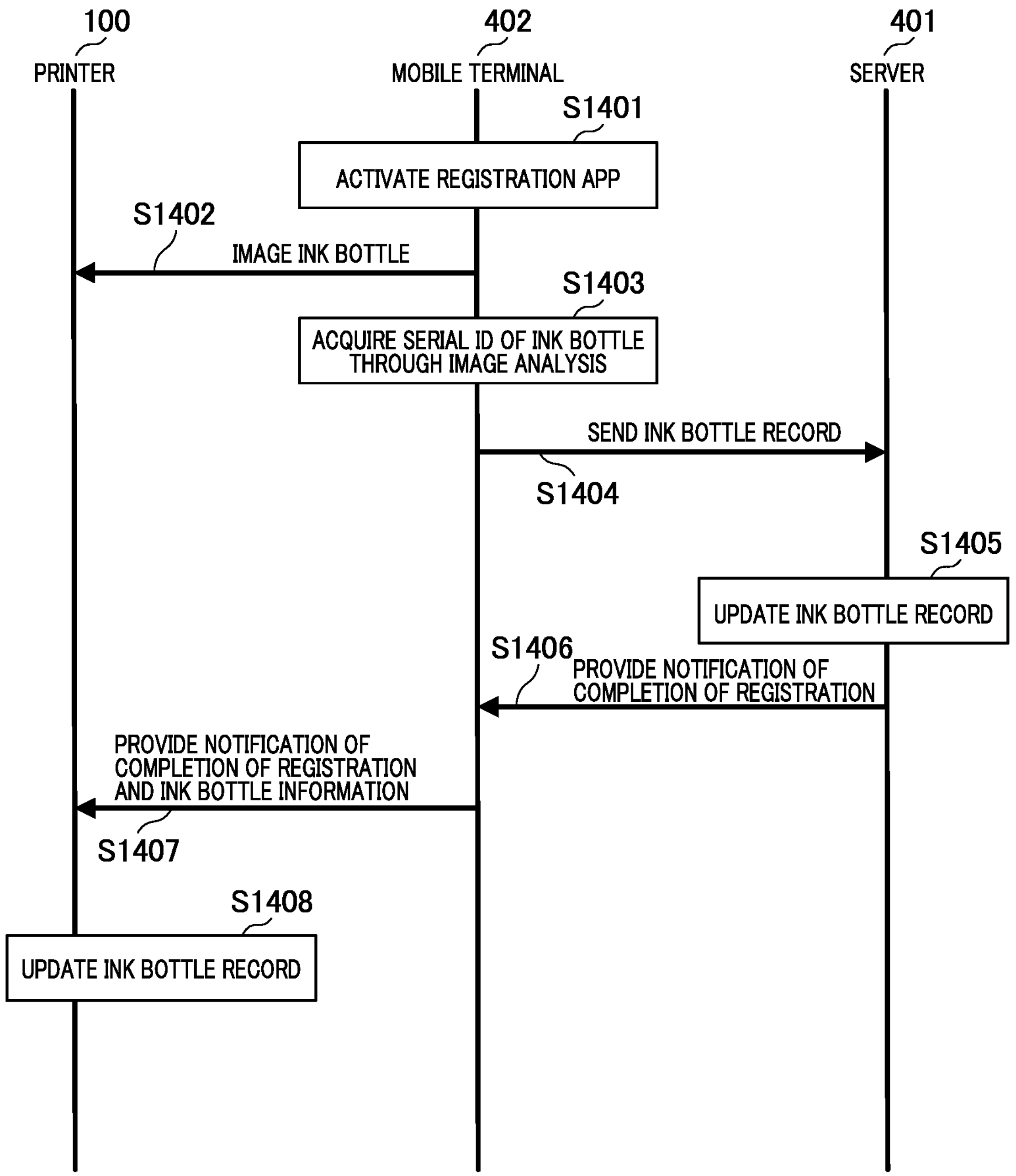
FIG. 14 is a sequence diagram illustrating processing of registering an ink bottle.

FIG. 14 is a sequence diagram illustrating processing of registering the ink bottle 303. In the present embodiment, the serial ID of the ink bottle 303 that has not yet been registered is acquired and registered in the server 401 and the printer 100 by using the mobile terminal 402. The processing performed by the mobile terminal 402 illustrated in FIG. 14 is realized by the CPU 802 of the mobile terminal 402 reading and executing, in the RAM 804, the control program stored in a memory such as the ROM 803.

Figure 13C:
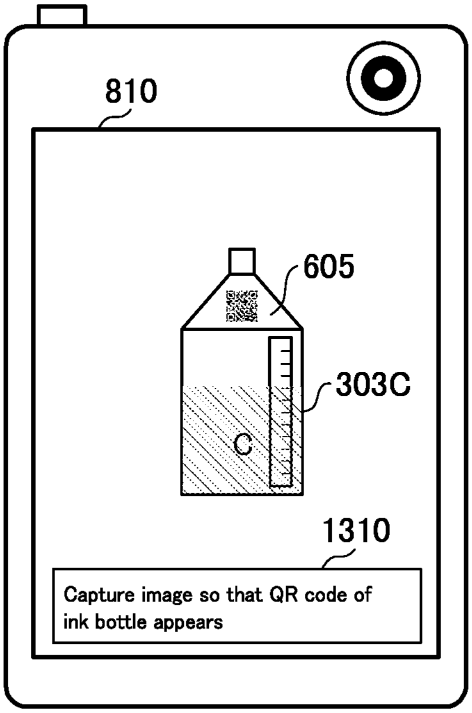

In S1401, the mobile terminal 402 activates the registration APP 901 on the basis of a user's instruction. In S1402, the registration APP 901 displays a screen for encouraging the user to image the QR code on the ink bottle to be registered. The user images the QR code 605 on the ink bottle 303 by using the camera portion 811 of the mobile terminal 402 in accordance with an instruction from the registration APP 901. FIG. 13C is a diagram illustrating an example of display on the screen when the QR code 605 on the ink bottle 303 is imaged. The image of the QR code 605 for identifying the ink bottle 303 imaged through the camera portion 811 and a guidance 1310 for providing an instruction for an imaging operation to the user are displayed on the display portion 810. In a case where the image of the QR code 605 is missed, or an imaging angle is not appropriate to read the QR code 202, an instruction to correct the imaging state is displayed as the guidance 1310 for the user.

Figure 13D:
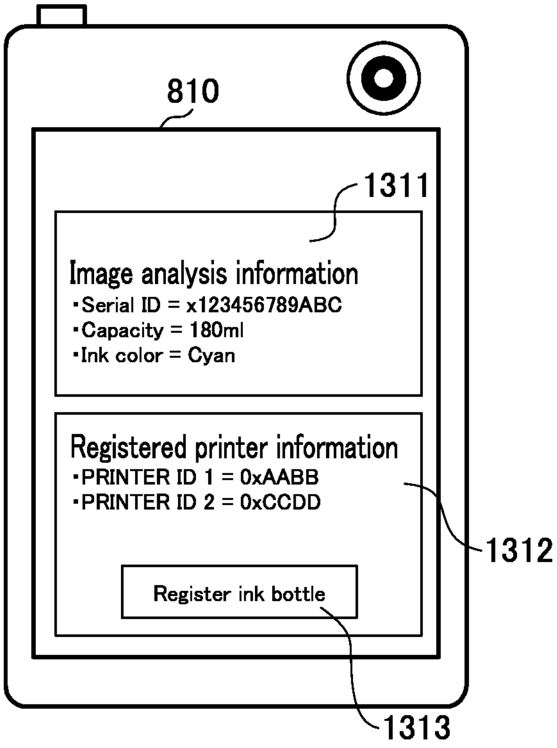

In Step S1203, the ink bottle management section 903 of the registration APP 901 analyzes the captured image of the QR code 605 and acquires information regarding the ink bottle including the serial ID of the ink bottle 303. For example, the registration APP 901 may acquire the manufacturing information such as a manufacturing date, capacity, and a color of the ink bottle 303, the field information, and the like from the QR code 605 in addition to the serial ID of the ink bottle 303. Also, the registration APP 901 may acquire connection information of the server 401 from the QR code 605. Then, the ink bottle management section 903 of the registration APP 901 registers the acquired information in the ink bottle record and stores the information in the non-volatile memory 815. FIG. 13D is a diagram illustrating an example of a screen that displays a result of analyzing the QR code 605. Image analysis information 1311 and printer information are displayed on the display portion 810. A result of analyzing the QR code 605 is displayed in the image analysis information 1311. The ink bottle ID, the ink capacity, the ink color, and the like are displayed in the image analysis information 1311, for example. Additionally, the printer 100 registering the ink bottle ID corresponding to the image analysis information 1311 is displayed in the printer information 1312. In addition, the printer 100 using the ink bottle corresponding to the image analysis information 1311 may be able to be registered in the printer information 1312. Also, in a case where the ink bottle 303 with the QR code 605 applied thereto has not yet been registered, a registration button 1313 may be displayed. The registration button 1313 is a button for registering the ink bottle displayed on the image analysis information 1311 in the ink bottle record 1101.

In S1404, the ink bottle management section 903 of the registration APP 901 sends the ink bottle record generated in S1203 to the server 401 as information regarding the ink bottle 303 to be registered. In S1405, the server 401 updates the ink bottle record managed by the server 401 on the basis of the ink bottle record sent from the mobile terminal 402. In S1406, the server 401 notifies the mobile terminal 402 of completion of registration of the ink bottle information.

In S1407, the mobile terminal 402 sends the ink bottle record generated in S1203 as information regarding the ink bottle 303 to be registered to the printer 100 using the ink bottle 303. In S1408, the printer 100 updates the ink bottle record managed by the printer 100 on the basis of the ink bottle record sent from the mobile terminal 402 and completes the processing. Through the above processing, it is possible to register the information regarding the ink bottle including the serial ID of the ink bottle in the server 401 and to further reflect the information in the printer 100 as well by imaging the ink bottle by the mobile terminal 402.

Figure 15:
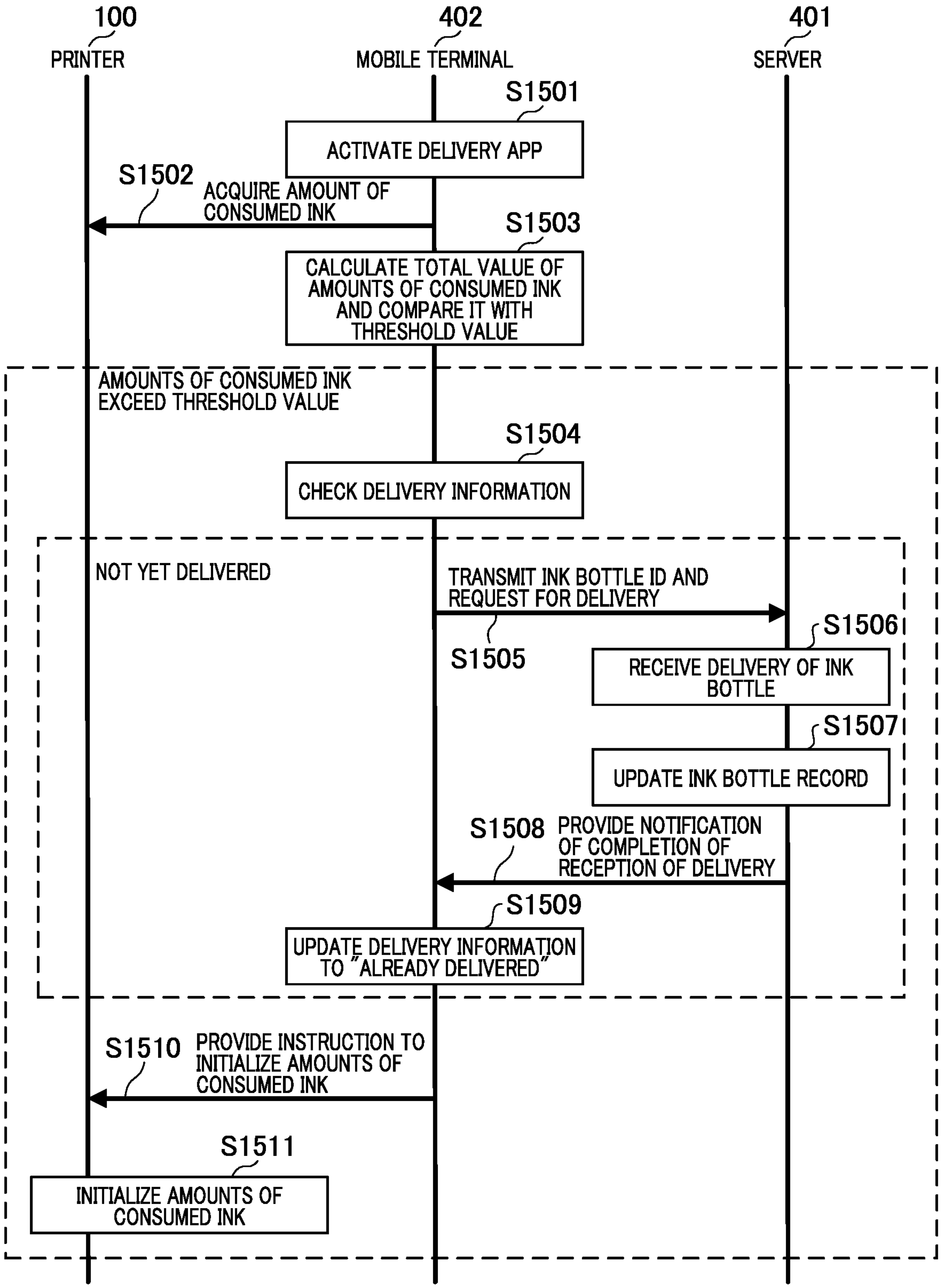
FIG. 15 is a sequence diagram illustrating processing of determining a request to deliver ink.
Figure 16:
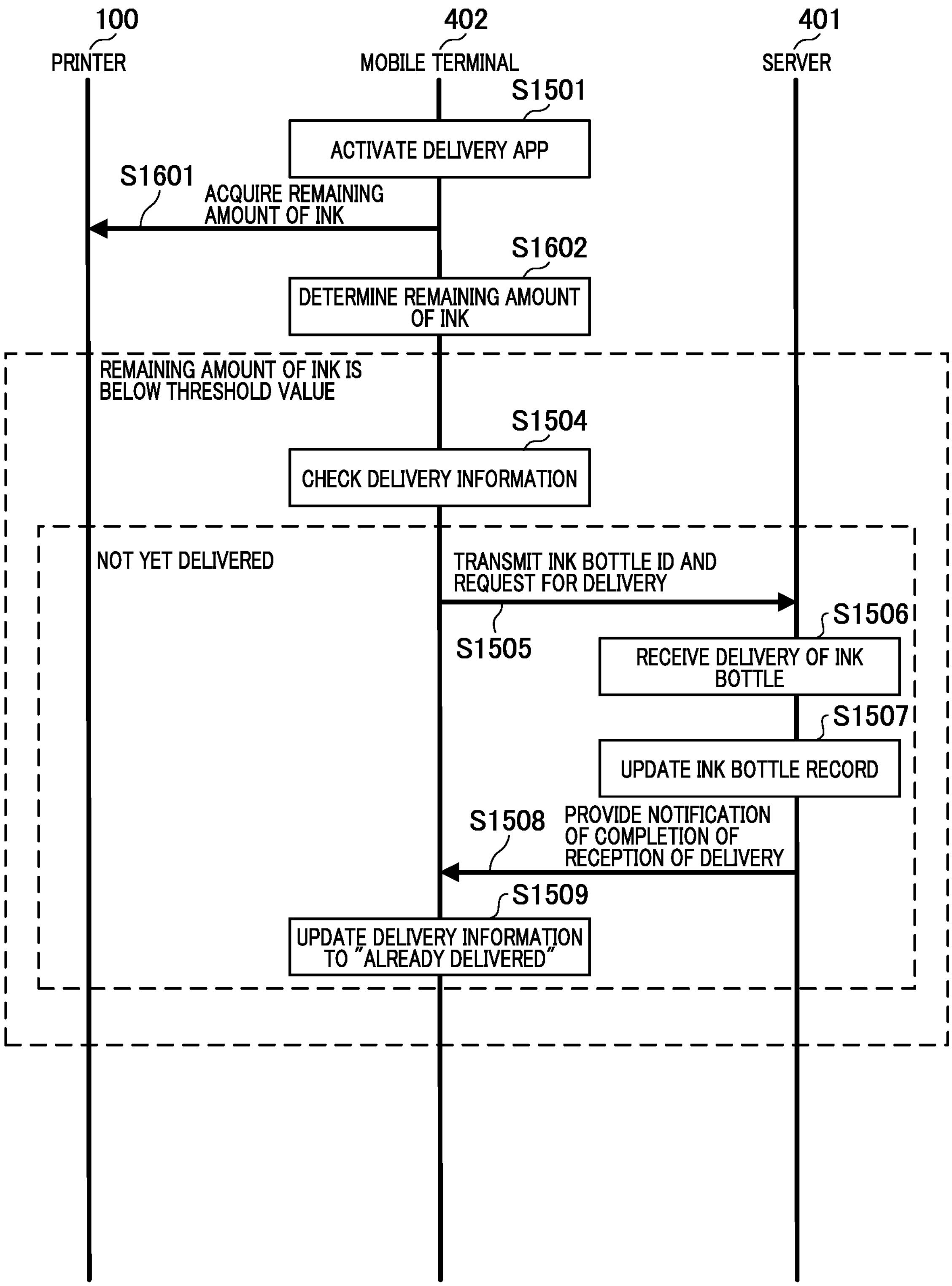
FIG. 16 is a sequence diagram illustrating processing of determining a request to deliver ink.

FIGS. 15 and 16 are sequence diagrams illustrating processing of determining a request (order) to deliver ink by using the mobile terminal 402. FIG. 15 illustrates an example in which whether or not it is possible to provide a request for delivery is determined on the basis of a total value of the amounts of consumed ink (the total amount of consumed ink), and FIG. 16 illustrates an example in which whether or not it is possible to provide a request for delivery is determined on the basis of the remaining amount of ink. The processing performed by the mobile terminal 402 illustrated in FIGS. 15 and 16 is realized by the CPU 802 of the mobile terminal 402 reading and executing, in the RAM 804, the control program stored in a memory such as the ROM 803.

First, the case where whether or not it is possible to provide a request for delivery is determined on the basis of the total value of the amounts of consumed ink will be described by using FIG. 15. The processing of providing a request to deliver the ink is executed for each ink bottle record held by the mobile terminal 402. Here, the ink bottle record 1102 illustrated in FIG. 11 will be described as an example. In S1501, the mobile terminal 402 activates the delivery APP 910 of the ink bottle on the basis of a user's instruction. Note that the mobile terminal 402 can also automatically activate the delivery APP at a timing set in advance by the user.

In S1502, the acquisition section 912 of the delivery APP 910 acquires the amount of consumed ink from all the printers, the used printer IDs of which are registered in the field information 1108 of the ink bottle record 1102. In a case where whether or not to provide a request to deliver the ink bottle 303 corresponding to the ink bottle record 1102 is determined, the mobile terminal 402 acquires the amount of consumed ink from the printers corresponding to the used printer ID 1109 and the used printer ID 1110. Here, the amount of consumed ink acquired from each printer is the amount of ink consumed after the previous amount of consumed ink is initialized (S1511). Any method can be used to acquire the amount of consumed ink from the printer, for example, by a method of acquiring it via a printer management application that monitors an operating condition of the printer including the amount of consumed ink.

In S1503, the delivery request section 913 of the delivery APP 910 calculates the total value of the amounts of consumed ink acquired from the printers and compares the calculated total value of the amounts of consumed ink with a threshold value. In a case where the total value of the amounts of consumed ink is less than the threshold value, it is not necessary to deliver the next ink bottle so far, and the processing is thus ended. On the other hand, in a case where the total value of the amounts of consumed ink is equal to or greater than the threshold value, the processing in S1504 is performed to ask for delivery of the next ink bottle.

In S1504, the delivery request section 913 of the delivery APP 910 checks delivery information 1112 of the ink bottle record. In a case where the value of the delivery information 1112 is a value indicating that processing for delivery has been performed, such as "already delivered", the processing is ended. On the other hand, in a case where the value of the delivery information 1112 is "not yet delivered", the processing in S1505 is performed. In S1505, the delivery request section 913 of the delivery APP 910 transmits the ink bottle ID and the request to deliver the ink bottle to the server 401. In S1506, the server 401 receives delivery of the ink bottle from the mobile terminal 402. In S1507, the server 401 updates the ink bottle record managed by the server 401. In S1508, the server 401 notifies the mobile terminal 402 of completion of reception of the delivery of the ink bottle. In the mobile terminal 402 that has received the notification of completion of reception of the delivery from the server 401, the ink bottle management section 903 of the delivery APP 910 updates the delivery information 1112 of the ink bottle record 1102 to "already delivered" in S1509. In S1510, the delivery APP 910 provides an instruction to initialize the amounts of consumed ink to the printers corresponding to the used printer IDs (the used printer ID 1109 and the used printer ID 1110) registered in the ink bottle record 1102. The printers that have received the instruction to initialize the amounts of consumed ink initialize the amounts of consumed ink in S1511.

Note that although the example in which the mobile terminal 402 automatically provides a request for delivery in the case where the value of the delivery information 1112 is "not yet delivered" in S1504 has been described in the present embodiment, the user may be able to select whether or not it is necessary to provide the delivery. For example, the mobile terminal 402 notifies a user of a screen for checking whether to provide a request for delivery along with the total value of the amounts of consumed ink calculated in S1503 and provides the request for delivery in S1505 only in a case where the user selects the delivery.

Next, a case where whether or not it is possible to provide a request for delivery on the basis of the remaining amount of ink will be described by using FIG. 16. The processing of providing a request to deliver the ink is executed for each ink bottle record held by the mobile terminal 402. Here, the ink bottle record 1102 illustrated in FIG. 11 will be described as an example. Note that the same reference signs will be applied to processing that is similar to that in FIG. 15, and description thereof will be omitted.

In S1601, the mobile terminal 402 acquires the remaining amounts of ink from all the printers, the used printer IDs have been registered in the field information 1108 of the ink bottle record 1102. In a case where whether or not to provide a request to deliver the ink bottle 303 corresponding to the ink bottle record 1102 is determined, the mobile terminal 402 acquires the remaining amounts of ink from the printers corresponding to the used printer ID 1109 and the used printer ID 1110. Any method can be used to acquire the amounts of consumed ink from the printers, for example, by a method of acquiring them via a printer management application that monitors an operating condition of the printers including the remaining amounts of ink.

In S1602, the mobile terminal 402 compares the remaining amount of ink acquired from each printer with a threshold value. In a case where there is even one remaining amount of ink that is less than the threshold value from among the remaining amounts of ink acquired from the printers, the processing in S1504 is performed. On the other hand, in a case where all the remaining amounts of ink acquired from the printers are equal to or greater than the threshold value, it is not necessary to deliver the next ink bottle so far, and the processing is thus ended.

In a case where there is a printer with a remaining amount of ink below the threshold value, the processing in S1504 to S1509 is performed similarly to FIG. 15, the delivery condition of the ink bottle is checked, a request for delivery is transmitted to the server 401 in a case where the ink bottle has not yet been delivered, and the ink bottle record is updated. As described above, the processing of providing a request for delivery on the basis of the remaining amount illustrated in FIG. 16 is ended. Note that whether or not to provide a request to deliver the ink bottle may be determined by combining determination based on the total of the amounts of consumed ink with determination based on the remaining amount of ink of each printer. For example, even if the total of the amounts of consumed ink does not reach the threshold value (first threshold value), the request to deliver the ink bottle is provided in a case where the remaining amount of the ink is less than the threshold value (second threshold value) in any of the printers. The initialization (S1511) of the amounts of consumed ink in the case where the total of the amounts of consumed ink is less than the threshold value and the request to deliver the ink bottle is provided is performed when the total of the amounts of consumed ink becomes equal to or greater than the threshold value rather than at the timing when the delivery information 1112 of the ink bottle becomes "already delivered". In this manner, it is possible to place an order for the ink bottle for filling the ink and to deliver it before the printer in which the ink is consumed early runs out of the ink even in a case where there is a large difference in amounts of consumed ink from among the plurality of printers.

Figure 17B:
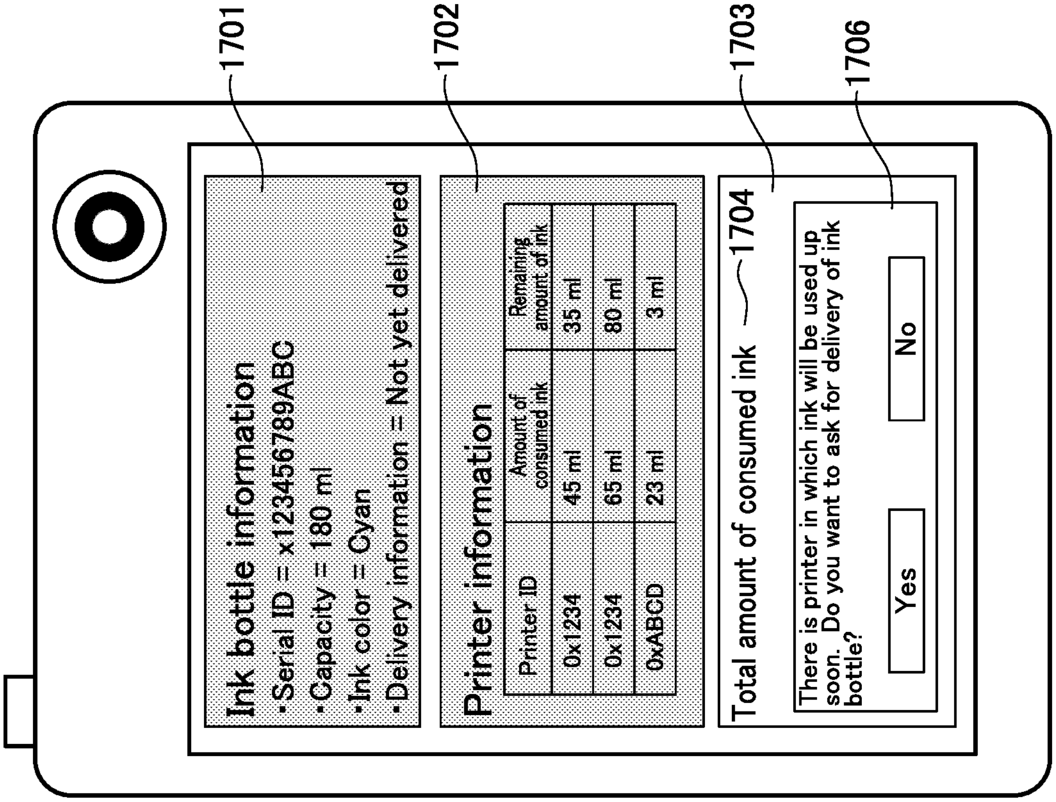
FIGS. 17A and 17B are diagrams illustrating examples of a screen for displaying a result of determining delivery of an ink bottle.
Figure 17A:
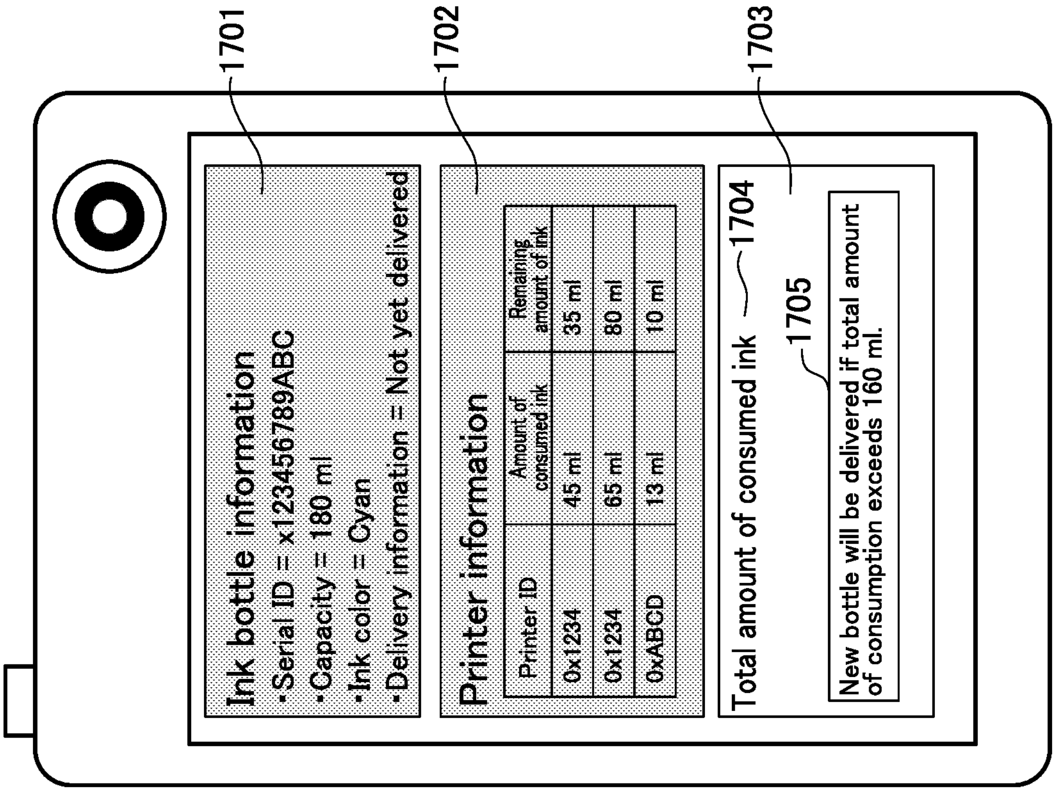

FIGS. 17A and 17B are diagrams illustrating examples of a screen of displaying a result of determining delivery of the ink bottle. FIG. 17A is an example of display in a case where the total value of the amounts of consumed ink is less than the threshold value. The screen illustrated in FIG. 17A is displayed on the display portion 810 of the mobile terminal 402 after the processing in S1504 in FIG. 15. The ink bottle information 1701 is information regarding the ink bottle 303 that is a target of determination of delivery. The ink bottle information 1701 is displayed on the basis of the ink bottle record 1102. The ink bottle information 1701 includes, for example, a serial ID, ink capacity, an ink color, and delivery information of the ink bottle. The printer information 1702 is information regarding the printer using the ink bottle displayed in the ink bottle information 1701. The printer information 1702 includes, for example, a printer ID for identifying the printer and the amount of consumed ink by the printer. Additionally, the printer information 1702 may include the remaining amount of ink in each printer. The delivery determination result 1703 is a result of performing determination regarding delivery of the ink bottle. The delivery determination result 1703 includes a total value 1704 of the amounts of consumed ink in the printers displayed in the printer information 1702 and a determination result 1705, for example. In a case where the total value of the amounts of consumed ink is equal to or greater than the threshold value, and an order to deliver a new bottle is placed, display to notify the user of the fact that the request for delivery has been provided is performed in the determination result 1705. On the other hand, in a case where the total value of the amounts of consumed ink is less than the threshold value, a guidance to notify the user of the threshold value to deliver the ink bottle is displayed.

FIG. 17B is an example of display in a case where the total value of the amounts of consumed ink is less than the threshold value (first threshold value) while there is a printer with the remaining amount of ink less than the threshold value (second threshold value). The screen illustrated in FIG. 17B is displayed on the display portion 810 of the mobile terminal 402 after the processing in S1504 in FIG. 16. The delivery determination result 1703 includes, for example, a total value 1704 of the amounts of consumed ink of the printers displayed in the printer information 1702 and a determination result 1706. A fact that there is a printer with the remaining amount of ink below the threshold value and a button for providing a request to deliver the ink bottle to the server 401 are displayed in the determination result 1706. The user can select the delivery of the ink bottle by operating the button displayed in the determination result 1706.

Although the example in which the ink bottle record is saved in both the non-volatile memory 815 of the mobile terminal 402 and the server 401 has been described in the present embodiment, the ink bottle record may be saved only in the server 401, and the ink bottle record may not be saved in the mobile terminal 402. The mobile terminal 402 that does not hold the ink bottle record acquires the information regarding the ink bottle from the server 401 as needed such as in a case where delivery of the ink is determined. In this manner, it is possible to determine the delivery even if the information regarding the ink bottle 303 is not stored in the non-volatile memory 815 of the mobile terminal 402, and it is possible to release the limited memory of the mobile terminal 402.

Also, although the example in which the code image is captured to acquire the information regarding the ink bottle has been described in the present embodiment, an IC chip provided to the printer or the ink bottle may be read by the mobile terminal 402 to acquire information regarding the printer or the ink bottle. Additionally, the imaging portion and the reading portion to acquire the information regarding the printer or the ink bottle may be devices externally provided to the network device. In addition, although the example of the ink used for printing by the printer has been described as a consumable material in the present embodiment, the present disclosure is not limited thereto, and the consumable material may be a material used for form shaping by a 3D printer that forms a three-dimensional object by using the consumable material. It is possible to place an order for the material at an appropriate timing in a case where a material in the same container is used by a plurality of 3D printers.

As described above, according to the present embodiment, it is possible to estimate a timing at which consumption of ink is completed by summing the amounts of consumed ink at a plurality of printers even in a case where the ink is refilled to the printers from one ink bottle. Also, it is possible to estimate the timing at which the consumption of ink is completed in the printers even in a case where the amounts of consumed ink differ, by checking the remaining amount of ink in each printer. It is thus possible to place an order for the ink bottle at an appropriate timing even in a case where the one ink bottle is shared by the plurality of printers.

Second Embodiment

In the first embodiment, the example in which the program operating on the mobile terminal 402 calculates the total value of the amounts of consumed ink and determines whether or not to provide a request for delivery has been described. In the present embodiment, a mode in which the calculation of the total value of the amounts of consumed ink is performed by the server 401 that provides a delivery service of ink will be described. In other words, the server 401 realizes the functions of the delivery APP 910. Note that content of description that is common to the first embodiment will be omitted.

Figure 18:
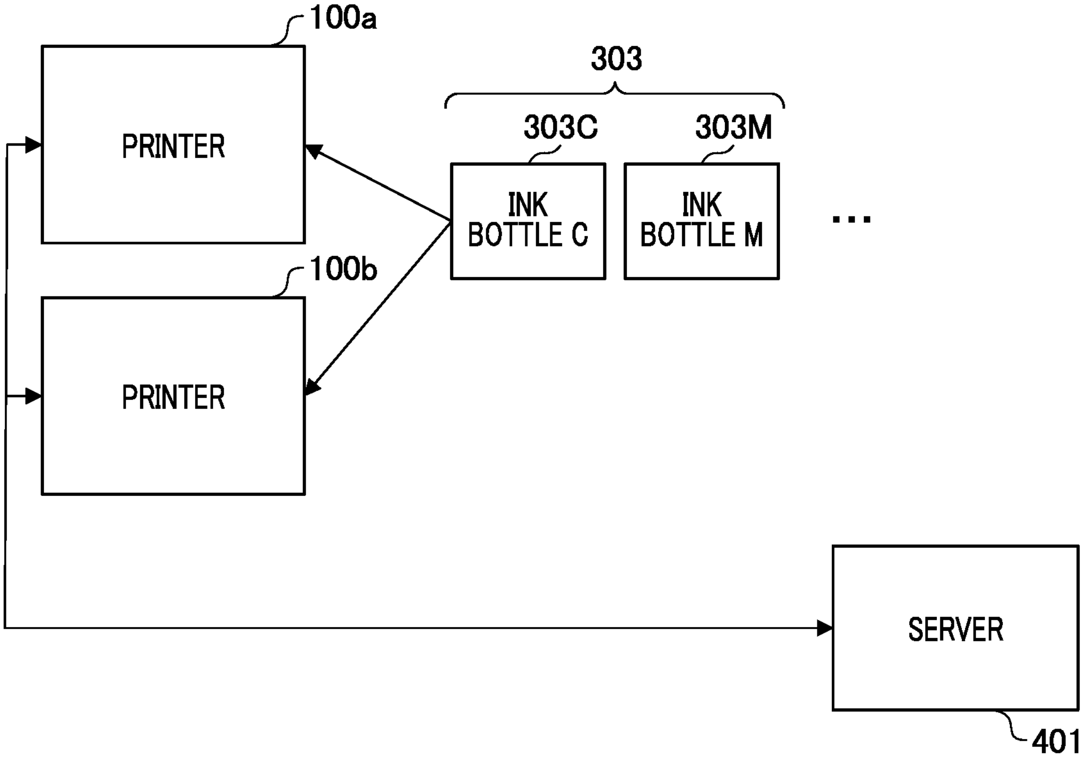
FIG. 18 is a diagram illustrating a configuration of a system according to a second embodiment.

FIG. 18 is a diagram illustrating a configuration of a system according to the present embodiment. The system includes a server 401 that is a network device connected to a plurality of printers 100 via a network. Although the mobile terminal 402 manages the ink bottle information (ink bottle record) in the first embodiment, the ink bottle information is input to the printers 100 in the present embodiment. The printers 100 store the ink bottle information in the EEPROM 104. Also, the printers 100 transmit, to the server 401, information such as the ink bottle information, printer information, and the amounts of consumed ink input by users via the network. The server 401 calculates a total value of the amounts of consumed ink of the ink bottles on the basis of the information received from the printers. The server 401 that has calculated the total value of the amounts of consumed ink compares the total value of the amounts of consumed ink with a threshold value and performs determination regarding delivery of the ink bottle. Processing content of the determining of the delivery of the ink bottle based on the total value of the amounts of consumed ink is similar to the processing content in FIG. 15. Also, the server 401 may acquire the remaining amount of ink in each printer from the printer 100, compare the remaining amount of ink with a threshold value, and perform determination regarding delivery of the ink bottle similarly to the processing content in FIG. 16.

Also, although the server 401 acquires information such as the remaining amount of ink directly from the printers 100 and determines whether or not to provide a request for delivery in the present embodiment, the information from the printers 100 may be acquired via a network device such as the mobile terminal 402. The server 401 acquires information regarding the amounts of consumed ink, the remaining amounts, or the like from the printers 100 via the mobile terminal 402, calculates the total value of the amounts of consumption, compares the total value of the amounts of consumption with each threshold value, and determines whether or not to deliver a new ink bottle. Additionally, the mobile terminal 402 may perform operations up to the calculation of the total value of the amounts of consumed ink and transmit the calculated total value to the server 401, and the server 401 may perform comparison with the threshold value. In addition, the device that collects information such as the amounts of consumed ink from the printers and transmits the information to the server 401 is not limited to the mobile terminal 402. Instead of the mobile terminal 402, an information processing device such as a PC or a printer that functions as a monitoring device that monitors operating conditions of the plurality of printers may collect the information such as the amounts of consumed ink from the plurality of inks and transmit the information to the server 401.

As described above, according to the present embodiment, it is possible to place an order for an ink bottle at an appropriate timing even in a case where ink is refilled into a plurality of printers from one ink bottle.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-076540, filed on May 6, 2022, which is hereby incorporated by reference wherein in its entirety.

What is claimed is:

1. A system that manages at least one consumable material used by a plurality of devices, the system comprising:

a memory storing instructions; and a processor executing the instructions causing the system to:

manage information regarding the consumable material for at least one container, acquire consumed amounts of the consumable material or remaining amounts of the consumable material from the plurality of devices using the consumable material in the respective container, and transmit information regarding a request to deliver a new container of the consumable material to a delivery service that delivers the new container of the consumable material used by at least one device among the plurality of devices on the basis of a total amount of consumption obtained by summing the consumed amounts of the consumable material of the plurality of devices or the remaining amounts of the consumable material of the plurality of devices.

2. The system according to claim 1, wherein the processor transmits the information regarding the request to deliver the new container of the consumable material to the delivery service in a case where the total amount of consumption obtained by summing the consumed amounts of the consumable material is equal to or greater than a threshold value, the total amount of consumption being acquired from the plurality of devices.

3. The system according to claim 1, wherein the processor transmits the information regarding the request to deliver the new container of the consumable material to the delivery service in a case where at least one remaining amount of the consumable material out of the remaining amounts of the consumable material acquired from the plurality of devices is less than a threshold value.

4. The system according to claim 1, wherein the information regarding the consumable material includes a delivery condition of the new container of the consumable material in the delivery service, and in a case where the delivery condition is a condition of not yet delivered, the processor transmits the information regarding the request to deliver the new container of the consumable material to the delivery service on the basis of a total amount of consumption obtained by summing the consumed amounts of the consumable materials or the remaining amounts of the consumable material.

5. The system according to claim 1, wherein the processor asks a user whether to ask for delivery of the new container in a case where it is determined that the request for the delivery is able to be provided on the basis of the total amount of consumption obtained by summing the consumed amounts of the consumable material or the remaining amounts of the consumable material, and the processor transmits the information regarding the request for the delivery to the delivery service in a case where the user asks for the delivery.

6. The system according to claim 1, wherein the information regarding the consumable material includes information uniquely identifying each of the plurality of containers of the consumable material and information uniquely identifying the plurality of devices that use the consumable material, and the processor acquires the consumed amounts of the consumable material and the remaining amounts of the consumable material from the plurality of devices corresponding to the information uniquely identifying the plurality of devices to which the consumable material has been refilled.

7. The system according to claim 1, wherein the processor acquires and registers the information regarding the consumable material by reading a two-dimensional code image attached to the container and further registers, in the information regarding the consumable material, information indicating which of the plurality of devices uses the consumable material in the container.

8. The system according to claim 1, wherein counts of the consumed amounts of the consumable material transmitted to the system by the plurality of devices are initialized in a case where the total amount of consumption is equal to or greater than a threshold value.

9. The system according to claim 1, wherein the device is an image forming device that prints an image on a recording medium by using the consumable material or a 3D printer that forms a three-dimensional object by using the consumable material, and the consumable material is ink used by the image forming device or a material used by the 3D printer.

10. The system according to claim 1, wherein a request to deliver the new container of the consumable material is provided by transmitting the information.

11. A network device comprising:

a memory storing instructions; and a processor executing the instructions causing the network device to:

manage information regarding at least one consumable material for at least one container, acquire consumed amounts of the consumable material or remaining amounts of the consumable material from a plurality of devices using the consumable material in the respective container, transmit information regarding a request to deliver a new container of the consumable material to a delivery service that delivers the new container of the consumable material used by at least one device among the plurality of devices on the basis of a total amount of consumption obtained by summing the consumed amounts of the consumable material or the remaining amounts of the consumable material, and capture an image.

12. A method of controlling a system that manages at least one consumable material used by a plurality of devices, the method comprising:

managing information regarding the consumable material for at least one container;

acquiring consumed amounts of the consumable material or remaining amounts of the consumable material from the plurality of devices using the consumable material in the respective container; and transmitting information regarding a request to deliver a new container of the consumable material to a delivery service that delivers the new container of the consumable material used by at least one device among the plurality of devices on the basis of the total amount of consumption obtained by summing the consumed amounts of the consumable material or the remaining amounts of the consumable material.

13. A non-transitory storage medium storing a control program of a system that manages at least one consumable material used by a plurality of devices, the control program causing a computer to perform each step of a control method of the system, the method comprising:

managing information regarding the consumable material for at least one container;

acquiring consumed amounts of the consumable material or remaining amounts of the consumable material from the plurality of devices using the consumable material in the respective container; and transmitting information regarding a request to deliver a new container of the consumable material to a delivery service that delivers the new container of the consumable material used by at least one device among the plurality of devices on the basis of the total amount of consumption obtained by summing the consumed amounts of the consumed consumable material or the remaining amounts of the consumable material.

* * * * *